United States Patent
Morimoto et al.

(10) Patent No.: US 8,077,146 B2
(45) Date of Patent: Dec. 13, 2011

(54) DISPLAY SYSTEM AND METHOD FOR DETECTING POINTED POSITION

(75) Inventors: Atsuhisa Morimoto, Nara (JP); Masakazu Ohira, Shiki-gun (JP); Hitoshi Hirohata, Hashimoto (JP)

(73) Assignee: Sharp Kabushiki Kaisha, Osaka (JP)

(*) Notice: Subject to any disclaimer, the term of this patent is extended or adjusted under 35 U.S.C. 154(b) by 563 days.

(21) Appl. No.: 12/265,625

(22) Filed: Nov. 5, 2008

(65) Prior Publication Data
US 2009/0140980 A1    Jun. 4, 2009

(30) Foreign Application Priority Data
Nov. 7, 2007    (JP) ................................. 2007-290131

(51) Int. Cl.
*G06F 3/033* (2006.01)
(52) U.S. Cl. ........................................................ 345/158
(58) Field of Classification Search ........ 345/8, 156–158, 345/179–180; 348/744; 353/42; 359/634
See application file for complete search history.

(56) References Cited

U.S. PATENT DOCUMENTS

| | | | |
|---|---|---|---|
| 6,570,584 B1 | 5/2003 | Cok et al. | |
| 7,176,881 B2* | 2/2007 | Nishimura et al. | 345/156 |
| 7,312,787 B2* | 12/2007 | Fujioka et al. | 345/156 |
| 7,630,522 B2* | 12/2009 | Popp et al. | 382/115 |
| 2002/0067419 A1 | 6/2002 | Inoue et al. | |
| 2007/0018915 A1 | 1/2007 | Tang et al. | |
| 2007/0060391 A1 | 3/2007 | Ikeda et al. | |

FOREIGN PATENT DOCUMENTS

| | | |
|---|---|---|
| JP | 06-308879 A | 11/1994 |
| JP | 07-121293 A | 5/1995 |
| JP | 08-071252 A | 3/1996 |
| JP | 08-335136 A | 12/1996 |
| JP | 2007-066080 A | 3/2007 |
| JP | 2007-083024 A | 4/2007 |
| JP | 2007-086995 A | 4/2007 |

OTHER PUBLICATIONS

T. Higashi., "DC Operating Metal-halide Lamp for LCD Projector", Optical Technology Magazine Light Edge No. 11, Oct. 1997, pp. 6-9.
M. Shinohara., "Backlight to Realize LCD of Ultrahigh Brightness and High Color Reproducibility", All about Electronic Display with Illustrations, Oct. 30, 2006, pp. 92-95.
U.S. Office Action dated Jul. 22, 2011, for U.S. Appl. No. 12/248,481.

* cited by examiner

*Primary Examiner* — Abbas Abdulselam
(74) *Attorney, Agent, or Firm* — Birch, Stewart, Kolasch & Birch, LLP

(57) ABSTRACT

A plurality of infrared-light-emitting areas are displayed in a display screen of a liquid crystal display apparatus in a method that allows each of the infrared-light-emitting areas to be distinguished. Then, an image in a direction of a pointed position is captured by an operating device. Based on a result of distinguishing each of the infrared-light-emitting areas and a position of each of the infrared-light-emitting areas, a pointed position on the display screen is calculated. This makes it possible to properly detect the pointed position on the display screen pointed by the operating device, regardless of (i) a distance between the operating device and the display apparatus and (ii) a rotation angle of the operating device around an axis in an image capture direction of the operating device.

12 Claims, 21 Drawing Sheets

POSITION THAT IS POINTED
BY OPERATING DEVICE

COORDINATE SYSTEM
OF DISPLAY SCREEN

COORDINATE SYSTEM
OF CAPTURED IMAGE

FIG. 22

| Distance Between Light-Emitting Areas In Captured Image / Current Distance Between Light-Emitting Areas On Display Screen | $W_{I1}$ | $W_{I2}$ | $W_{I3}$ |
|---|---|---|---|
| $W_{c1}$ | $W_{n11}$ | $W_{n21}$ | $W_{n31}$ |
| $W_{c2}$ | $W_{n12}$ | $W_{n22}$ | $W_{n32}$ |
| $W_{c3}$ | $W_{n13}$ | $W_{n23}$ | $W_{n33}$ |

POINTED POSITION

CENTER OF CAPTURED IMAGE
(POINTED POSITION)

US 8,077,146 B2

DISPLAY SYSTEM AND METHOD FOR DETECTING POINTED POSITION

This Nonprovisional application claims priority under 35 U.S.C. §119(a) on Patent application Ser. No. 290131/2007 filed in Japan on Nov. 7, 2007, the entire contents of which are hereby incorporated by reference.

FIELD OF THE INVENTION

The present invention relates to (i) a display system that can detect a position on a display screen that is pointed by an operating device such as a pointer (hereinafter, such a position is also referred to as a pointed position) and (ii) a method for detecting the pointed position.

BACKGROUND OF THE INVENTION

Recently, thickness of display apparatuses such as liquid crystal displays and plasma displays has been reduced. Further, display apparatuses that have a large screen size have been prevailing.

Such a thin and large-screen display apparatus may be used, for example, in presentation in a meeting, presentation for introducing a product or the like, or as a display apparatus for a video game. In a scene in which the display apparatus is used in the above-mentioned way, the display apparatus is operated by pointing, with the use of an operating device such as a pointer, a desired point (position or place) on an image that is displayed on the display screen.

For example, Patent Document 1 (Japanese Unexamined Patent Publication No 66080/2007 (Tokukai 2007-66080) (published on Mar. 15, 2007)) discloses a technique for detecting coordinates of a pointed point on a display screen. In the technique, (i) light emitting devices provided to front and rear ends of a pointer are driven in different blinking patterns, respectively, (ii) images including light-emitting areas that are provided to the front and rear ends of the pointer are captured by cameras that are provided on the right and left sides of the display screen, respectively, and (iii) coordinates of a pointed point on the display screen is detected by analyzing/calculating, according to the trigonometry, a direction (angle) of each of the light-emitting areas and a distance between (a) each of the light-emitting areas and (b) each of the cameras or the display screen.

Patent Document 2 (Japanese Unexamined Patent Publication No. 83024/2007 (Tokukai 2007-83024) (published on Apr. 5, 2007)) discloses a system that detects a position of coordinates on a display screen. In the system, a module including an LED that emits infrared light is provided in the vicinity of the display screen, for example, at an upper part or a lower part of a display apparatus, (ii) an image of the LED is captured by using (a) a filter that is provided in a controller and transmits only infrared light and (b) an image sensing device such as a CMOS sensor or a CCD, and (iii) a position of coordinates in the display screen is detected from a positional change of the LED in data of thus captured image.

According to the conventional techniques, unfortunately, a position pointed by the operating device cannot be appropriately detected in a case where a position of the operating device is close to the display screen.

That is, in the technique as disclosed in Patent Document 1, the cameras for capturing images of the lightening points at the front and rear ends of the pointer (operating device) are provided on the left and right sides of the display screen in the display apparatus. As such, in a case where a position of the pointer is close to the display screen, the lightening point may be in a position out of a range in which the camera can capture an image.

As for the technique as disclosed in Patent Document 2, an image sensing device provided in a controller (operating device) is arranged to capture an image of the infrared light emitted by the LED module that is provided at an upper part or a lower part of the display screen of the display apparatus. Therefore, as in the case of Patent Document 1, in a case where a position of the controller is close to the display screen, the LED module may be in a position out of a range in which the image sensing device can capture an image.

FIGS. 25(a), 25(b), 26(a), and 26(b) are explanatory diagrams each illustrating a relation of (i) a distance between an operating device 101 and a display apparatus 102 and (ii) a range in which a position that is pointed by the operating device 101 can be detected, in the same arrangement as the arrangement disclosed in Patent Document 2.

FIGS. 25(a) and 25(b) illustrates a case where a distance between the display apparatus 102 and the operating device 101 is sufficiently large. In such a case, an LED module 103 is included within a range in which the image sensing device that is provided in the operating device 101 can capture an image, regardless of a position, on the display screen, that is pointed by the operating device 101. Therefore, in such a case, a position pointed by the operating device 101 can be detected.

On the other hand, FIGS. 26(a) and 26(b) illustrates a case where the distance between the display apparatus 102 and the operating device 101 is short. In such a case, the LED module 103 cannot be within a range in which the image sensing device can capture an image, depending on a position pointed by the operating device 101. In this case, the position pointed by the operating device 101 cannot be detected.

In the conventional techniques explained above, when a position on the display screen is pointed by the operating device in a state where the operating device is rotated around an axis that is a linear line connecting between the operating device and the display screen (for example, in a sate where the operating device is turned upside down), the pointed position may not be detected properly. In other words, in a case where the operating device is rotated with respect to a reference position around an axis in an image capture direction (a direction in which the operating device captures an image), a wrong pointed position may be detected. The reference position here is assumed to be a position in which an x-axis direction and a y-axis direction in a coordinate system of the display screen agree with an x-axis direction and a y-axis direction in a coordinate system of a captured image, respectively.

For example, as illustrated in FIGS. 27(a) and 28(a), a case where the light-emitting areas L1 and L2 are provided on the right and left sides of the display screen, respectively, is considered. In a case where the operating device that is not turned upside down (in a state where the operating device is in the reference position) points a lower-left position of the display screen as illustrated in FIG. 27(a), a captured image becomes as illustrated in FIG. 27(b). On the other hand, the operating device that is turned upside down (in a state where the operating device is rotated with respect to the reference position around an axis in the image capture direction) points an upper-left position of the display screen as illustrated in FIG. 28(a), a captured image becomes as illustrated in FIG. 28(b). In this way, thought the operating device points different positions on the display screen, the same captured images are obtained in a case where the operating device is turned upside down and in a case the operating device is turned not upside down, respectively. As a result, the pointed position may be wrongly detected.

SUMMARY OF THE INVENTION

The present invention is attained in view of the above problem. An object of the present invention is to properly detect a position on a display screen that is pointed by an operating device, regardless of (i) a distance between the operating device and a display apparatus and (ii) a rotation angle of the operating device around an axis in an image capture direction of the operating device.

In order to solve the problem above, a display system of the present invention including: a display apparatus including a display screen on which an image is displayed in accordance with image data; an operating device for pointing a position, as a pointed position, on the display screen and for capturing an image including the pointed position on the display screen, the operating device being not in touch with the display screen; two or more infrared-light-emitting areas each emitting light having a wavelength in an infrared wavelength region, the infrared-light-emitting areas being provided to the display apparatus; and pointed position detecting section that detects the pointed position on the display screen, based on positions of the infrared-light-emitting areas included in a captured image that is captured by the operating device, the display system includes: a light-emitting area distinguishing section that distinguishes each of the infrared-light-emitting areas in the captured image, at least one of the infrared-light-emitting areas being provided within the display screen of the display apparatus, the infrared-light-emitting areas each emitting light in a method that allows the light-emitting area distinguishing section to distinguish, based on the captured image, each of the infrared-light-emitting areas from one another.

According to the arrangement, at least one of the infrared-light-emitting areas each emitting light having a wavelength in an infrared wavelength region is provided in the display screen. As compared with a conventional arrangement in which an infrared-light-emitting area is provided only outside a display screen, this arrangement allows a distance between a display apparatus and an operating device to become shorter which distance is required for including two or more infrared-light-emitting areas in a range in which an image can be captured. Accordingly, this allows a distance between the display screen and the operating device to become shorter which distance is required for properly calculating a position, on the display screen, pointed by the operating device. As a result, the position, on the display screen, pointed by the operating device can be properly detected even in a case where the distance between the operating device and the display apparatus is short.

Further, according to the above arrangement, each of the infrared-light-emitting areas is caused to emit light in a method that allows the light-emitting area distinguishing section to distinguish each of the infrared-light-emitting areas, based on the captured image. Accordingly, even in a case where the operating device is rotated, at the time when the image is captured, with respect to a reference position (a position in which the x-axis direction and y-axis direction in the coordinate system of the display screen agrees with the x-axis direction and the y-axis direction in the coordinate system of the captured image) around an axis in an image capture direction, a pointed position on the display screen can be properly detected in consideration of the rotation, based on respective positions of the light-emitting areas and the result of distinguishing each of the light-emitting areas.

For a fuller understanding of the nature and advantages of the invention, reference should be made to the ensuing detailed description taken in conjunction with the accompanying drawings.

BRIEF DESCRIPTION OF THE DRAWINGS

FIG. 8($b$) is a waveform chart illustrating one example of a waveform of a driving voltage that is supplied to each of sub-pixels of Ir in a block corresponding to a light-emitting area Ir2.

FIG. 9($b$) is an explanatory diagram illustrating a captured image that is obtained by capturing an image of the display section as illustrated in FIG. 9($a$) in a state where the operating device is turned upside down. FIG. 9 ($c$) is an explanatory diagram illustrating an image obtained, by turning a captured image of FIG. 9($b$) so that an x-axis direction and a y-axis direction in a coordinate system of the display apparatus agrees with an x-axis direction and a y-axis direction in a coordinate system of the captured image.

FIG. 22 is an explanatory diagram illustrating one example of a lookup table that is stored in a memory section provided in a display apparatus of the display system according to the another embodiment of the present invention.

FIGS. 23(a) and 23 (b) are explanatory diagrams each illustrating a relation between a pointed position that is pointed by an operating device and a display position of light-emitting areas on a display screen, in the display system according to the another embodiment of the present invention.

DESCRIPTION OF THE EMBODIMENTS

First Embodiment

The following explains one embodiment of the present invention.

Figure 2:
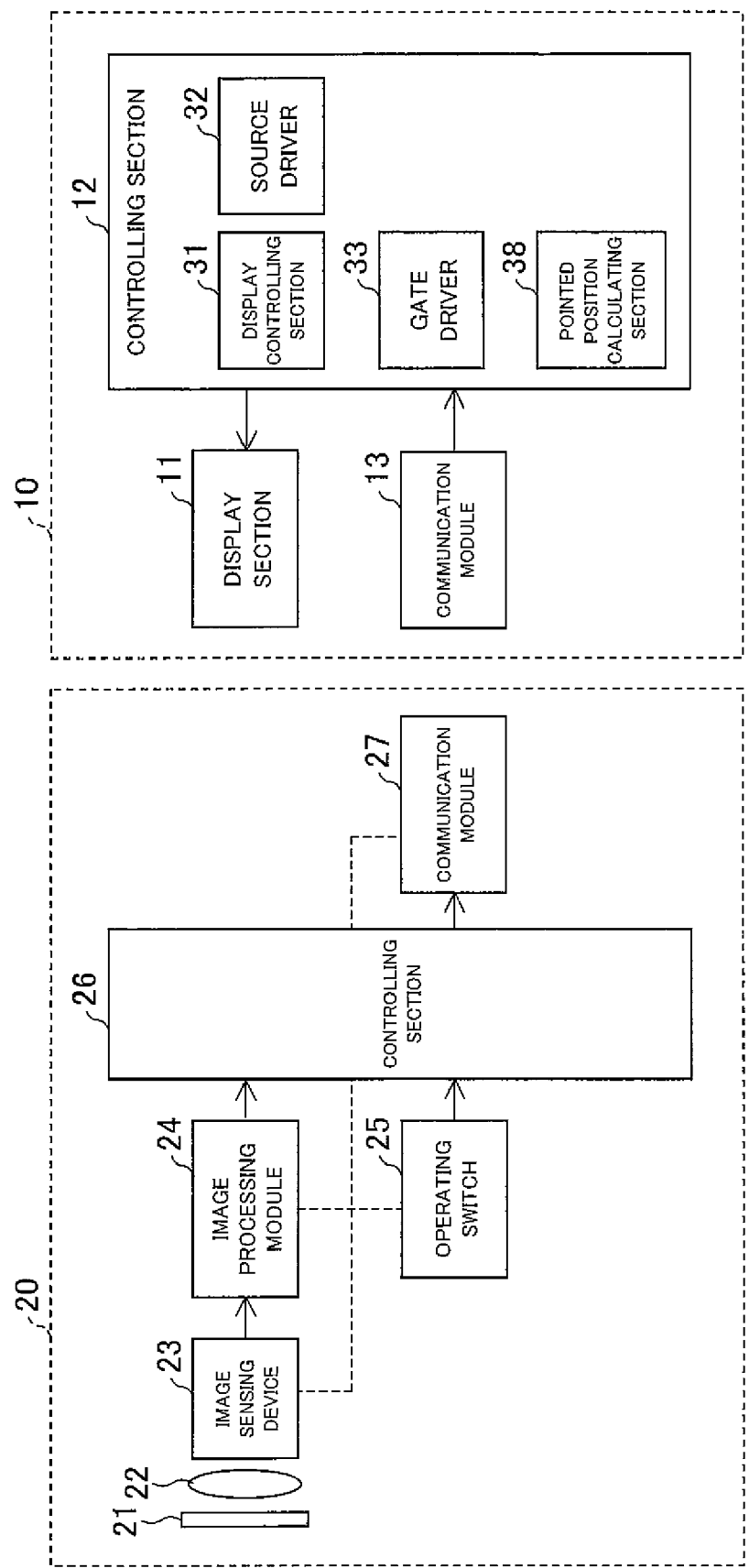
FIG. 2 is a block diagram schematically illustrating an arrangement of a display system according to one embodiment of the present invention.

FIG. 2 is a block diagram schematically illustrating an arrangement of a display system 1 of the present embodiment. As illustrated in FIG. 2, the display system 1 includes a liquid crystal display apparatus 10 and an operating device 20.

The liquid crystal display apparatus 10 includes a display section 11, a controlling section 12, and a communication module 13.

Figure 3:
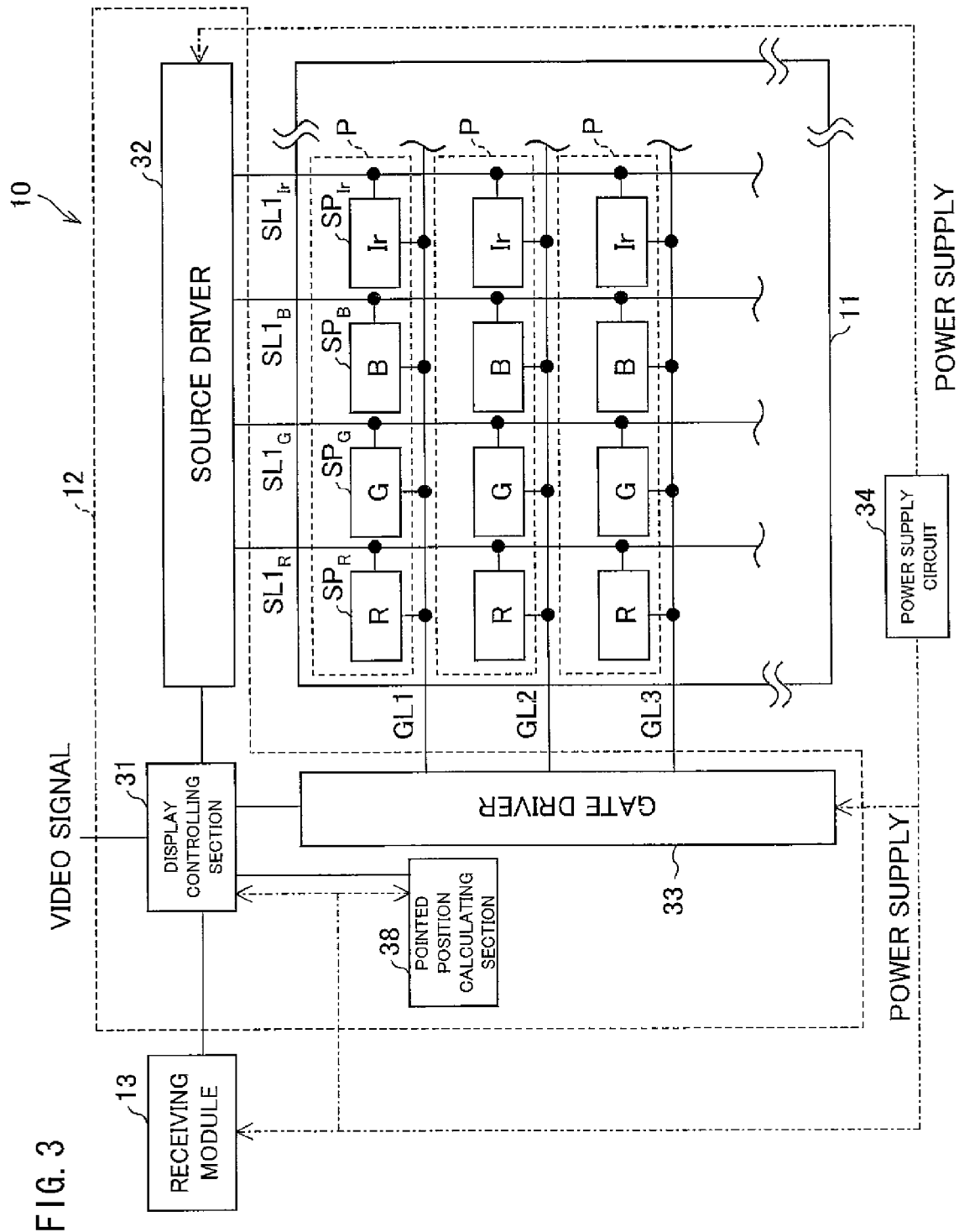
FIG. 3 is a block diagram schematically illustrating an arrangement of a display apparatus provided in the display system as illustrated in FIG. 2.
Figure 4:
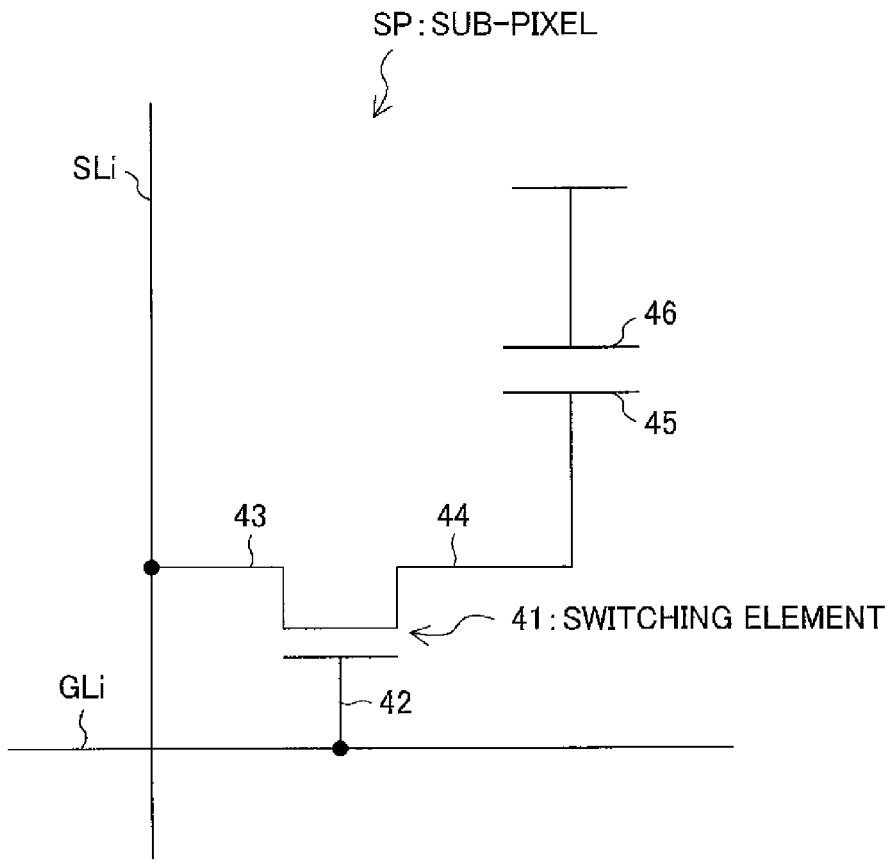
FIG. 4 is a diagram schematically illustrating an arrangement of each of sub-pixels provided in a display section of the display apparatus as illustrated in FIG. 3.

FIG. 3 is a block diagram schematically illustrating an arrangement of the liquid crystal display apparatus 10. FIG. 4 is a diagram schematically illustrating an arrangement of each of sub-pixels in the liquid crystal display apparatus 10 as illustrated in FIG. 3.

As illustrated in FIG. 3, the liquid crystal display apparatus 10 includes the display section (a display panel) 11, the controlling section 12, the communication module 13, and a power source circuit 34. In the display section 11, many pixels P are arranged in a matrix. Each of the pixels P is made of sub-pixels SPR, SPG, SPB, SPIr corresponding to four colors including R (Red), G (Green), B (Blue), and Ir (Infrared). The controlling section 12 includes a source driver 32, a gate driver 33, a display controlling section 31, and a pointed position calculating section 38. The communication module 13 carries out data transmission to/data reception from the operating device 20. The power supply circuit 34 supplies power to each section. The liquid crystal display 10 is driven according to an active matrix system. In the liquid crystal display apparatus 10, a pixel to which no driving voltage is applied displays a black image.

The display section 11 includes a plurality of data signal lines $SL1_R$, $SL1_G$, $SL1_B$, $SL1_{Ir}$, ... $SLn_R$, $SLn_G$, $SLn_B$, and $Sln_{Ir}$ ("n" represents any integer not less than 2) and a plurality of scanning signal lines GL1 ... GLm ("m" represents any integer not less than 2) each of which intersects with each of the data signal lines. The sub-pixel is provided at each intersection of the data signal lines and the scanning signal lines.

The pointed position calculating section 38 calculates a pointed position on a display screen that is pointed by the operating device 20, based on information that is received from the operating device 20 via the communication module 13. A method of calculating a pointed position is explained in detail later.

The display controlling section 31 controls an intensity of light passing through each of sub-pixels R, G, and B by controlling respective operations of the source driver 32 and the gate driver 33, so that an image in accordance with display image data is displayed on the display section 11. The display image data may be, for example, data that is inputted from an external device (not illustrated) that is communicably connected to the liquid crystal display apparatus 10, data that is read out from a memory section (not illustrated) provided in the liquid crystal display apparatus 10, or broadcast data that is received via reception means (not illustrated) such as an antenna or a tuner.

The display controlling section 31 also controls an intensity of light that passes through the sub-pixel Ir, by controlling the respective operations of the source driver 32 and the gate driver 33, so that a plurality of light-emitting areas (infrared-light-emitting areas) are displayed at positions on the display screen. The display controlling section 31 displays the light-emitting areas in a method that allows each of the light-emitting areas to be distinguished based on a captured image obtained by capturing an image of the light-emitting areas. The display controlling section 31 also controls the respective operations of the source driver 32 and the gate driver 33, based on a result of calculating a pointed position with the use of the pointed position calculating section 38, so as to display a predetermined image (an image such as a mark indicating the pointed position) at the pointed position on the display screen that is pointed by the operating device 20. A display method of the light-emitting areas and a method of calculating the pointed position are explained later in details.

The source driver 32 generates a driving voltage (image signal) for driving each of the sub-pixels in accordance with display image data, and applies the driving voltage to the data signal line corresponding each of the sub-pixels. The gate driver 33 controls a voltage to be applied to each of the scanning signal lines, so that the driving voltage outputted from the source driver 32 is sequentially supplied at a predetermined timing to each of the sub-pixels that are provided along each of the data signal lines.

As illustrated in FIG. 4, each of the sub-pixels is provided with a switching element 41. An example of the switching element 41 is an FET (Field Effect Transistor) or a TFT (Thin Film Transistor). A gate electrode 42 of the switching element 41 is connected to a scanning signal line GLi ("i" is any integer not less than 1). A source electrode 43 of the switching element 41 is connected to a data signal line. Moreover, a drain electrode 44 of the switching element 41 is connected to a sub-pixel electrode 45. A counter electrode 46 provided so as to be opposed to the sub-pixel electrode 45 is connected to a common electrode line (not illustrated) that is common to all the sub-pixels.

Figure 5:
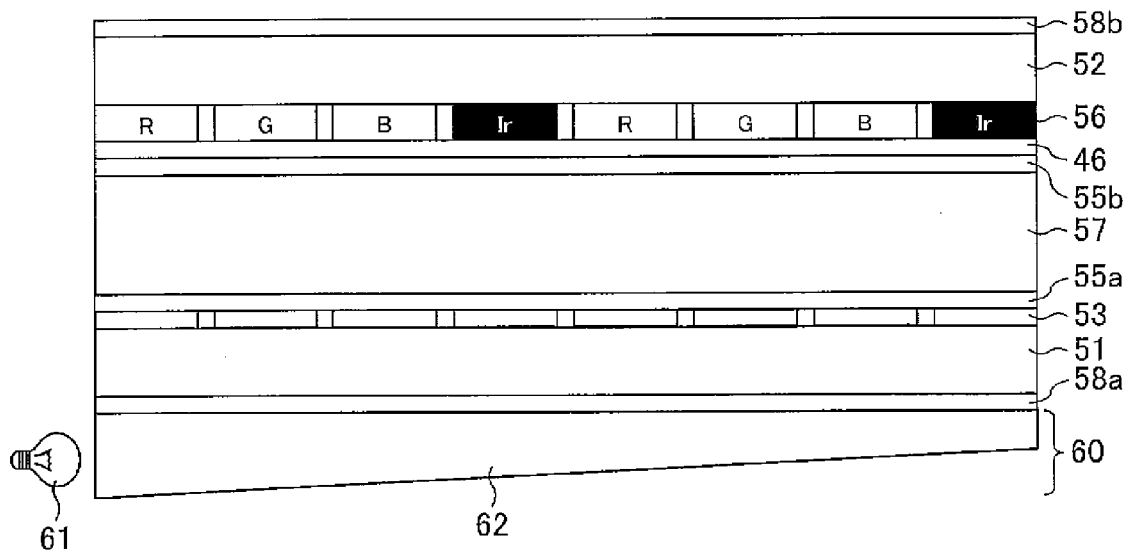
FIG. 5 is a cross sectional view illustrating the display section of the display apparatus as illustrated in FIG. 3.

FIG. 5 is a cross sectional view of the display section 11. As illustrated in FIG. 5, the display section 11 includes a glass substrates 51 and 52 and a liquid crystal layer 57. The glass substrates 51 and 52 are provided by using a spacer (not illustrated) so as to face each other and to keep a predetermined space between the glass substrates 51 and 52. The liquid crystal layer 57 is made of a liquid crystalline material that is sealed in between the glass substrates 51 and 52. Examples of the liquid crystalline material are commonly used liquid crystalline materials including a nematic liquid crystal, a smectic liquid crystal, and a ferroelectric liquid crystal.

On a surface of the glass substrate 51 that faces the glass substrate 52, a wiring layer 53, and an alignment film 55a are provided. The wiring layer 53 is provided with, for example, the data signal lines $SL1_R$, $SL1_G$, $SL1_B$, $SL1_{Ir}$, ..., the scanning signal lines GL1 ..., the switching element 41, and the sub-pixel electrode 45. The alignment film 55a is formed so as to cover the wiring layer 53. Further, on a surface on a side opposite to the surface of the glass substrate 51 that faces the glass substrate 52, a polarization plate 58a is provided. Further, a backlight unit 60 is provided so as to face the polarization plate 58a.

On a surface of the glass substrate 52 that faces the glass substrate 51, a color filter layer 56, the counter electrode 46 made of a transparent conductive film, and an alignment film 55b are formed in this order. The alignment film 55b is formed so as to cover the counter electrode 46. On a surface on a side opposite to the surface of the glass substrate 52 that faces the glass substrate 51 is provided with a polarization plate 58b.

A direction of alignment treatment that is applied to each of the alignment films 55a and 55b, and a direction of absorption axis of each of the polarization plates 58a and 58b may be set according to a type of a liquid crystalline substance that is sealed in the liquid crystal layer 57, in the same manner as a conventionally known liquid crystal display apparatus. In the present embodiment, the sub-pixel electrode 45 and the counter electrode 46 are provided to different substrates, respectively. However, the present invention is not limited to this. Both the sub-pixel electrode 45 and the counter electrode 46 may be provided on the same substrate, that is, in a so-called IPS method.

In the color filter layer 56, a filter is provided to each of the sub-pixels. The filter transmits light having a wavelength in a wavelength region corresponding to one of R, G, B, and Ir and shields light having wavelengths in other wavelength regions. An example of a filter that transmits Ir light (light having a wavelength in an infrared wavelength region) is an infrared-transmitting visible-absorbing filter of colored glass filters produced by HOYA Corporation.

The backlight unit 60, as illustrated in FIG. 5, includes a light source 61 and a reflecting section 62. The backlight unit 60 reflects light irradiated from the light source 61 by the reflecting section 62 so as to irradiate light on the display section 11. A diffusion film may be provided between the backlight unit 60 and the display section 11. This diffusion film is for providing uniform irradiation on an entire display surface of the display section 11 by diffusing light emitted from the light source 61.

An example of the light source 61 is a light source that has an emission spectrum in a visible region and an infrared region. For example, a metal halide lamp may be used as such a light source (See Non-Patent Document 1: Tadatoshi, Higashi, "CDC Operating Metal-halide Lamp for LCD Projector", Optical Technology Information Magazine LIGHT EDGE, Vol. 11, October 1997, pp. 6-9).

In the liquid crystal display apparatus 10, when the scanning signal line GLi is selected, the switching element 41 of each of the sub-pixels that are connected to the scanning signal line is turned on. Then, the source driver 32 applies, between the sub-pixel electrode 45 and the counter electrode 46 via the data signal line, a signal voltage that is determined in accordance with display image data that is supplied to the display controlling section 31. Between the sub-pixel electrode 45 and the counter electrode 46, ideally, a voltage obtained when the switching element 41 is turned off is kept during the time in which the switching element 41 is turned off after an end of a selecting period of the scanning signal line GLi. This causes a driving voltage to be applied between the sub-pixel electrode 45 and the counter electrode 46 in each of the sub-pixels, independently, so that an electric field in accordance with an image to be displayed is applied to each sub-pixel region of the liquid crystal layer that is provided between the sub-pixel electrode 45 and the counter electrode 46. As a result, an alignment state of liquid crystal molecules is changed in each sub-pixel region so that the image is displayed.

According to the arrangement, the liquid crystal display apparatus 10 controls an intensity of light that passes through the sub-pixel region of the liquid crystal layer 57 by controlling a voltage that is applied between the sub-pixel electrode 45 and the counter electrode 46 of each of the sub-pixels. As a result, a color display is performed. Simultaneously, the liquid crystal display apparatus 10 allows infrared light to pass through sub-pixels determined as appropriate, and displays, at display positions determined as appropriate, light-emitting areas that emit light, invisible to human eyes, in an infrared region.

As illustrated in FIG. 2, the operating device 20 includes an infrared-transmitting filter 21, a lens 22, an image sensing device 23, an image processing module 24, an operating switch 25, a controlling section 26, and a communication module 27. The operating device 20 is capable of pointing any position on the display screen of the liquid crystal display apparatus 10 by pointing a head part of the operating device 20 towards the position on the display screen.

The infrared-transmitting filter 21 is a filter that transmits light having a wavelength in an infrared wavelength region. For example, an infrared-transmitting visible-absorbing filter of the colored glass filters produced by HOYA Corporation may be used as the infrared-transmitting filter 21.

The lens 22 focuses the infrared light that has passed through the infrared-transmitting filter 21 on an image capturing section of the image sensing device 23. The image sensing device 23 is made of, for example, a CMOS or a CCD. The image sensing device 23 captures an image by receiving the infrared light that is focused by the lens 22, and outputs an image signal of a captured image to the image processing module 24. A center in a direction in which the image is captured by the image sensing device 23 (i.e., a direction of an optical axis of the lens 22) (hereinafter, also referred to as an image capture direction) is parallel to a pointing direction of the operating device 20 (i.e., a direction of a straight line connecting a pointed position on the display screen and the head part of the operating device 20). Accordingly, the center of the captured image corresponds to the pointed position on the display screen.

Figure 6:
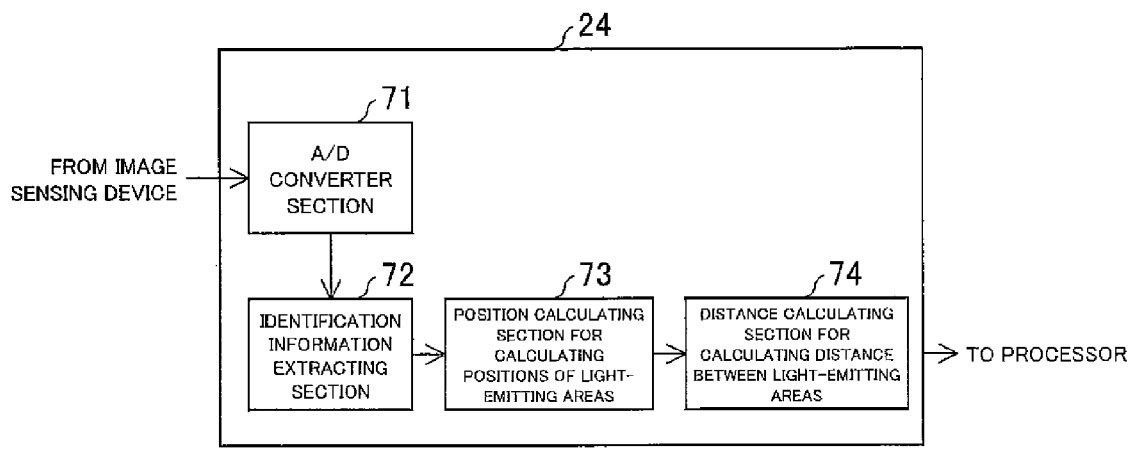
FIG. 6 is a block diagram illustrating an arrangement of an image processing module in an operating device that is provided in the display system as illustrated in FIG. 2.

As illustrated in FIG. 6, the image processing module 24 includes an A/D converter section 71, an identification information extracting section 72, a position calculating section 73 for calculating positions of light-emitting areas, and a distance calculating section 74 for calculating a distance between light-emitting areas. The A/D converter section 71 generates a digital image signal by carrying out A/D conversion of image data that is supplied from the image sensing device 23. The identification information extracting section 72 extracts identification information (e.g., an average luminance of each of the light-emitting areas in a predetermined period) of each of the light-emitting areas, based on the captured image. The position calculating section 73 calculates, based on a digital image signal supplied from the A/D converter section 71, a relative position, with respect to a center of the captured image, of the light-emitting areas (a relative position, in a coordinate system of the captured image, of the light-emitting areas with respect to a center (pointed position) of the captured image). The distance calculating section 74 calculates a distance between the light-emitting areas in the captured image (a distance between light-emitting areas in the coordinate system of the captured image). These processes are explained later in details.

The operating switch 25 receives an instruction input from a user. The operating switch 25 includes many button keys and the like.

The controlling section 26 controls an operation of each section provided in the operating device 20. Further, the controlling section 26 generates information to be transmitted to the liquid crystal display apparatus 10, based on, for example, (i) a result of extraction of identification information, (ii) a result of calculating a relative position, (iii) a result of calculating a distance between the light-emitting areas, and (iv) information inputted by a user from the operating switch 25.

The communication module 27 carries out data transmission to/data reception from the communication module 13 in the liquid crystal display apparatus 10. For example, the communication module 27 transmits information that is supplied from the controlling section 26 to the liquid crystal display apparatus 10. A communication medium that is employed by the communication module 27 is not specifically limited. The communication medium may be a wireless medium or a wired line medium.

Figure 1:
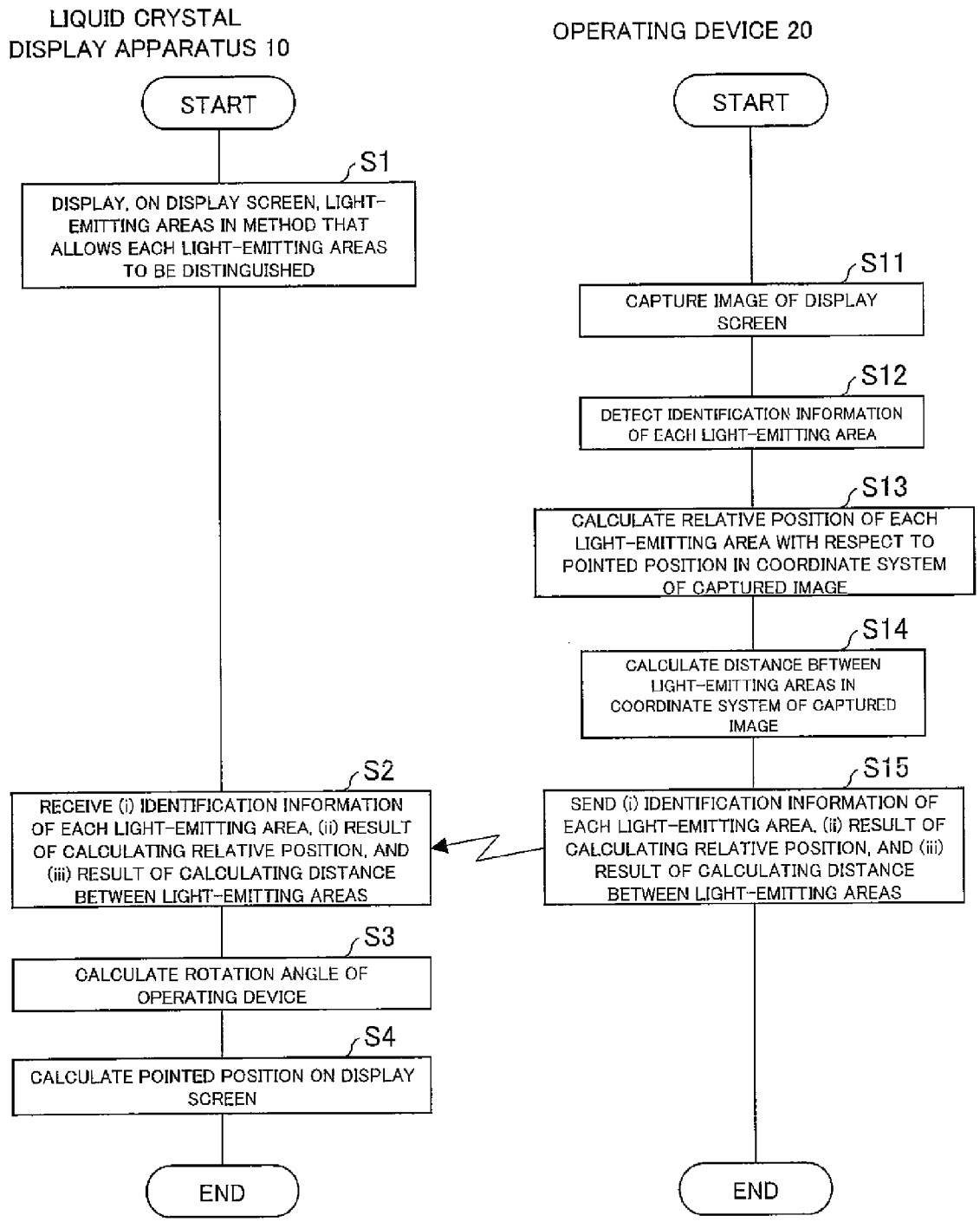
FIG. 1 is a flow chart illustrating respective flows of (i) a display process of infrared-light-emitting areas and (ii) a process of calculating a pointed position, in a display system according to one embodiment of the present invention.

The following explains a display method of light-emitting areas and a method of calculating a pointed position. FIG. 1 is a flow chart illustrating respective flows of a light-emitting area display process and a pointed-position calculating process.

First, the display controlling section 31 controls respective operations of the source driver 32 and the gate driver 33 so that a plurality of light-emitting areas (two in this embodiment) are displayed at different brightnesses (luminances) at predetermined positions of the display screen, respectively (S1). This process may be executed in a case where a mode (pointed position calculating mode) for calculating a pointed position pointed by the operating device 20 is selected by a user. Alternatively, this process may be executed all the time. The display controlling section 31 also controls the respective operations of the source driver 32 and the gate driver 33 in accordance with image data so as to drive sub-pixels of R, G, and B. Consequently, the display controlling section 31 displays an image in accordance with the image data, concurrently with the light-emitting areas.

Figure 7:
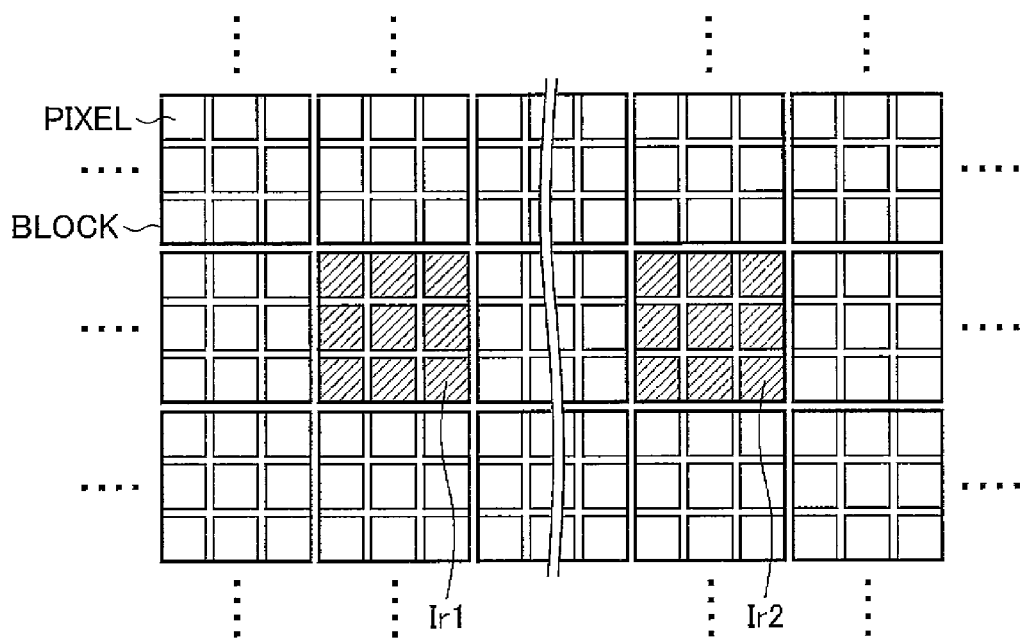
FIG. 7 is an explanatory diagram illustrating an arrangement in which, in the display apparatus of FIG. 3, a display screen is divided into a plurality of blocks and blocks selected from the plurality of blocks are caused to function as infrared-light-emitting areas.

In the present embodiment, as illustrated in FIG. 7, the display screen is divided into many blocks each of which is made of 3×3 pixels. 2 blocks that are selected from the many blocks are used as the light-emitting areas. In this case, driving voltages to be applied to sub-pixels SPIr of Ir in the two blocks are varied for each block. This changes brightness (luminance) of each of the light-emitting areas. As a result, each of the light-emitting areas can be displayed in a distinguishable manner. In the present embodiment, for simplification of the explanation, each of the light-emitting areas is shown as a block made of 3×3 pixels. However, a size of each of the light-emitting areas (a size of a block that becomes a light-emitting area) is not limited to this. A block of each of the light-emitting areas may be any size as long as each of the light-emitting areas includes the number of pixels with which the light-emitting areas can be distinguished from one another based on the captured image that is captured by the operating device 20.

Figure 8A:
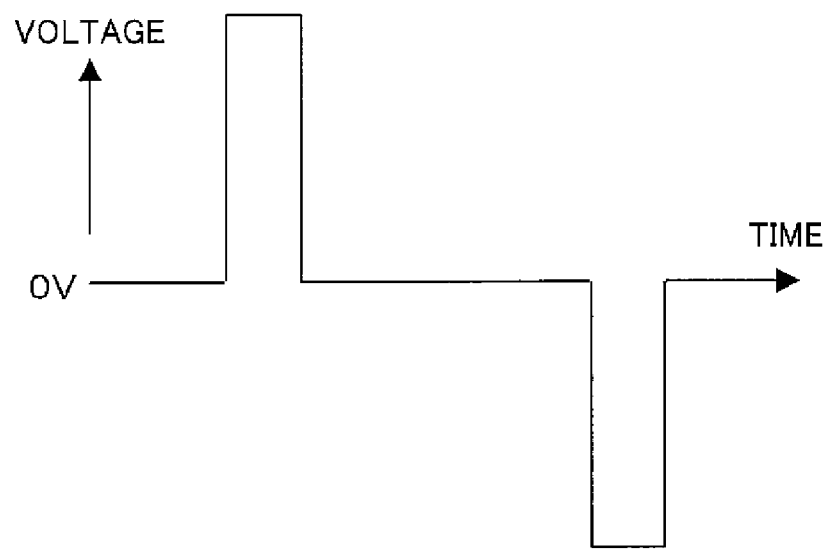
FIG. 8($a$) is a waveform chart illustrating a waveform of a driving voltage that is supplied to each of sub-pixels of Ir in a block corresponding to a light-emitting area Ir1 in FIG. 7.
Figure 8B:
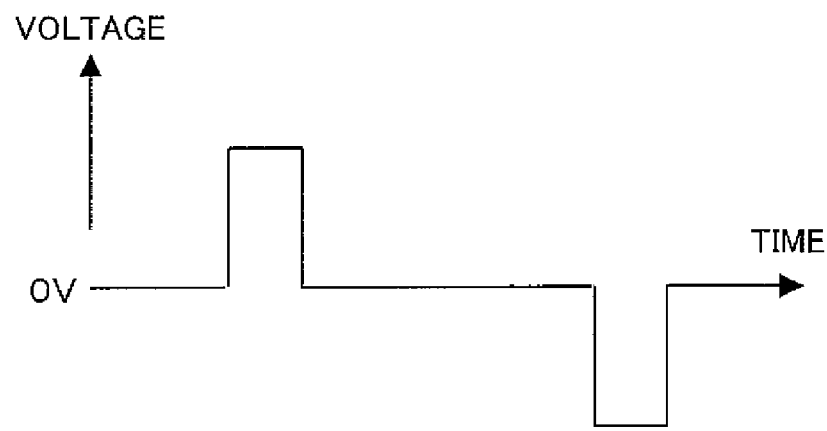

FIG. 8(*a*) illustrates a waveform of a driving voltage (data signal) that is supplied to each of sub-pixels SPIr of Ir in a block corresponding to the light-emitting area Ir1 in FIG. 7. FIG. 8(b) illustrates a waveform of a driving voltage that is supplied to each of sub-pixels SPIr of Ir in a block corresponding to the light-emitting area Ir2 in FIG. 7. In other words, in one frame, gate electrodes are sequentially scanned. When a scanning signal line connected to the sub-pixels SPIr corresponding to the light-emitting area Ir1 is selected, the driving voltage as shown in FIG. 8(a) is supplied to a data signal line that is connected to the sub-pixels SPIr. Similarly, when a scanning signal line that is connected to sub-pixels SPIr corresponding to the light-emitting area Ir2 is selected, a driving voltage as shown in FIG. 8(b) is supplied to a data signal line connected to the sub-pixels SPIr.

In the present embodiment, as illustrated in FIGS. 8(a) and 8(b), a polarity of a driving voltage with respect to each of the sub-pixels is inverted every time the driving voltage is applied. This makes it possible to prevent liquid crystal from deteriorating due to continuous application of a driving voltage of the same polarity.

As illustrated in FIGS. 8(a) and 8(b), a driving voltage that is supplied to each of the sub-pixels SPIr corresponding to the light-emitting area Ir1 is arranged to be larger than a driving voltage that is supplied to each of the sub-pixels SPIr corresponding to the light-emitting area Ir2 (In the example as illustrated in FIGS. 8(a) and 8(b), the driving voltage that is supplied to each of the sub-pixels SPIr corresponding to the light-emitting area Ir2 is set to a half of the driving voltage that is supplied to each of the sub-pixels SPIr corresponding to the light-emitting area Ir1). This makes it possible to vary brightness (luminance) for each of the light-emitting areas. Accordingly, for example, each of the light-emitting areas can be distinguished by calculating and comparing an average value (average luminance) of brightness of each of the light-emitting areas in a predetermined period (e.g., in a predetermined frame period) in a captured image.

The controlling section 26 of the operating device 20 causes the image sensing device 23 to capture an image of the display screen (S11). Accordingly, the operating device 20 captures an image in a direction in which the head part of the operating device 20 points. This process may be carried out at predetermined time intervals or continuously.

Alternatively, the process may be carried out in response to an input of an instruction from the user via the operating switch 25. As a further alternative, the process may be carried out continuously or at predetermined time intervals while a user pushes down a predetermined button.

Then, the controlling section 26 of the operating device 20 causes the identification information extracting section 72 of the image processing module 24 to extract identification information of each of the light-emitting areas in the captured image (S12). Specifically, the identification information extracting section 72 detects, as identification information, an average value of each of the brightnesses (luminances) of respective light-emitting areas in a predetermined period (a predetermined frame period). The identification information to be extracted is not limited to such an average value. The identification information to be extracted may be set in advance in accordance with a display method of the light-emitting areas in the liquid crystal display apparatus 10.

Next, the controlling section 26 of the operating device 20 causes the position calculating section 73 of the image processing module 24 to calculate a relative position of the light-emitting areas (S13). The relative position is a position relative to a pointed position in the coordinate system of the captured image (in the present embodiment, the center of the captured image). Specifically, the controlling section 26 causes the position calculating section 73 to calculate coordinates of a midpoint between the light-emitting areas in the coordinate system of the captured image. Alternatively, the controlling section 26 may cause the position calculating section 73 to calculate coordinates of each of the light-emitting areas in the coordinate system of the captured image.

Then, the controlling section 26 of the operating device 20 causes the distance calculating section 74 of the image processing module 24 to calculate a distance between the light-emitting areas in the coordinate system of the captured image (S14).

Next, the controlling section 26 of the operating device 20 causes the communication module 27 to transmit, to the liquid crystal display apparatus 10, (i) identification information of each of the light-emitting areas extracted in S12, (ii) information indicative of a relative position calculated in S13, and (iii) information indicative of a distance between the light-emitting areas that is calculated in S14 (S15).

Then, receiving the information that is transmitted from the operating device 20 via the communication module 13 (S2), the pointed position calculating section 38 of the liquid crystal display 10 calculates a rotation angle, at the time when an image is captured, with respect to a reference position of the operating device 20 (S3). Specifically, the pointed position calculating section 38 calculates a rotation angle of the operating device 20 with respect to a reference position of the operating device 20, based on (i) luminance (identification information) of each of the light-emitting areas that are displayed on the display screen at the time when an image is captured and (ii) luminance (identification information) of each of the light-emitting areas that are extracted from the captured image.

Figure 9:
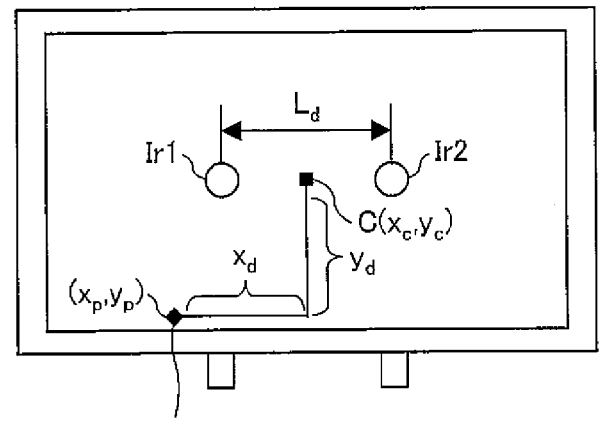
FIG. 9($a$) is an explanatory diagram illustrating one example of infrared-light-emitting areas that are displayed on the display section of the display apparatus as illustrated in FIG. 3.
Figure 9:
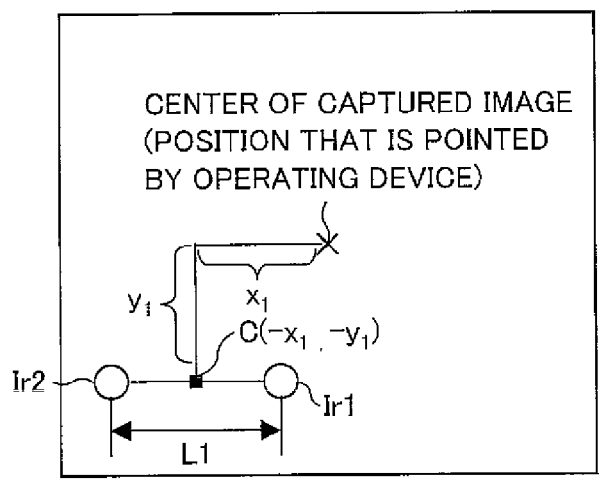
Figure 9:
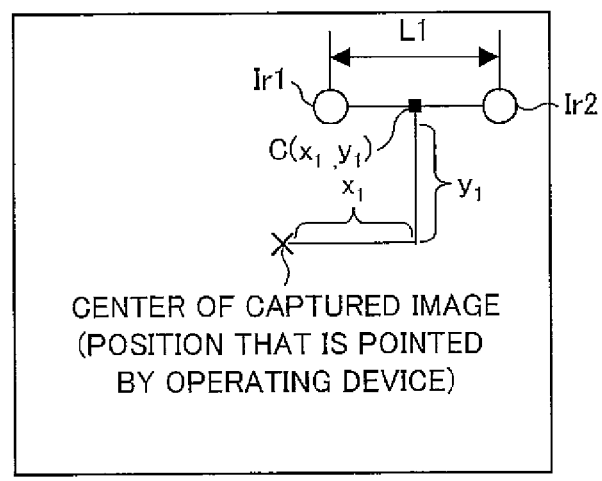

The following explains a method of calculating a rotation angle of the operating device 20 at the time when an image is captured. FIG. 9(a) is an explanatory diagram illustrating one example of two light-emitting areas Ir1 and Ir2 that are displayed on the display section 11 of the liquid crystal display apparatus 10. FIG. 9(b) is an explanatory diagram illustrating one example of a captured image in a case where an image of the display section 11 as illustrated in FIG. 9(a) is captured in a state where the operating device 20 is turned upside down.

The pointed position calculating section 38 of the liquid crystal display apparatus 10 compares respective coordinates of the light-emitting areas in a coordinate system of the display screen at the time when an image is captured, with respective coordinates of the light-emitting areas in the coordinate system of the captured image. As a result of the comparison, the pointed position calculating section 38 obtains a rotation angle of the coordinate system of the captured image with respect to the coordinate system of the display screen. For example, the rotation angle of the coordinate system of the captured image with respect to the coordinate system of the display screen is calculated based on, for example, (i) a relation between a slope of a straight line connecting the light-emitting areas in the coordinate system of the display screen and a slope of a straight line connecting the light-emitting areas in the coordinate system of the captured image, (ii) a relation, in terms of largeness, of an x coordinate of each of the light-emitting areas in the coordinate system of the display screen and an x coordinate of each of the light-emitting areas in the coordinate system of the captured image, and (iii) a relation, in terms of largeness, of a y coordinate of each of the light-emitting areas in the coordinate system of the display screen and a y coordinate of each of the light-emitting areas in the coordinate system of the captured image.

As a result, a rotation angle of the operating device 20, at the time when an image is captured, with respect to a reference position can be calculated. For example, in the case of FIG. 9(b), from the positional relation of the light-emitting areas, it is found that the coordinate system of the captured image is rotated by 180° with respect to the coordinate system of the display screen.

Next, the pointed position calculating section 38 of the liquid crystal display apparatus 10 calculates a pointed position, on the display screen, that is pointed by the operating device 20 (a pointed position that is pointed by the operating device 20 in the coordinate system of the display screen) (S4). The pointed position is calculated based on (i) the rotation angle that is calculated in S3 and (ii) the information indicating the relative position and information indicating a distance between the light-emitting areas that are received in S2. In other words, because the information that is received from the operating device 20 is positional information of the light-emitting areas based on the coordinate system the captured image, the pointed position calculating section 38 converts the received positional information to information in the coordinate system of the display screen so as to calculate a pointed position on the display screen that is pointed by the operating device 20.

The following explains a method of calculating the pointed position in the coordinate system of the display screen in more details.

First, the pointed position calculating section 38 converts a coordinate system of information indicative of a relative position that is received in S2 into a coordinate system of information corresponding to a reference position, by rotating the coordinate system of the information indicative of the relative position. This rotation is carried out based on a rotation angle that is calculated in S3 and that is of the operating device 20 at the time when an image is captured. That is, the conversion is carried out so that x-axis and y-axis directions of the coordinate system of the display screen agree with x-axis and y-axis directions of the coordinate system of the captured image. For example, in the case of FIG. 9(b), the coordinate system of the captured image is rotated by −180° around the center of the captured image. As a result, as illustrated in FIG. 9(c), the x-axis and y-axis directions of the coordinate system of the display image is caused to agree with the x-axis and y-axis directions of the coordinate system of the captured image.

As illustrated in FIG. 9(c), in the coordinate system of the captured image, coordinates of the center of the captured image are represented by (0,0); coordinates of a midpoint C between the light-emitting areas Ir1 and Ir2 are represented by (x1, y1); and a distance between the light-emitting areas Ir1 and Ir2 is represented by L1. On the other hand, as illustrated in FIG. 9(a), in the coordinate system of the display screen, a distance between the light-emitting areas Ir1 and Ir2 is represented by Ld; coordinates of a midpoint C between the light-emitting areas Ir1 and Ir2 are represented by (xc, yc); and coordinates of a pointed position that is pointed by the operating device 20 are represented by (xp, yp). Further, regarding a distance between (i) a pointed position pointed by the operating device 20 on the display screen and (ii) a midpoint of the light-emitting areas Ir1 and Ir2, xd represents a distance in the x-axis direction and yd represents a distance in the y-axis direction.

In this case, a coefficient c for converting the coordinate system of the captured image into the coordinate system of the display image is calculated by c=Ld/L1. Accordingly, xd and yd are respectively represented by xd=c×x1 and yd=c×y1. Therefore, the coordinates of the pointed position (the coordinates of the pointed position that is pointed by the operating device 20 in the coordinate system of the display screen) on the display screen can be specified by the equations: xp=xc−xd=xc−c×x1; and yp=yc−yd=yc−c×y1.

As explained above, in the display system 1 of the present embodiment, a plurality of light-emitting areas are displayed in the display screen of the liquid crystal display apparatus 10 in a method that allows each of the light-emitting areas to be distinguished. Then, the operating device 20 captures an image of the display screen. Further, the operating device 20 detects (i) identification information of the light-emitting areas included in the captured image (e.g., an average luminance of each of the light-emitting areas in a predetermined period), (ii) a relative position of each of the light-emitting areas with respect to the pointed position in the captured image, and (iii) a distance between the light-emitting areas in the captured image. This detection result is sent to the liquid crystal display apparatus 10. Subsequently, the liquid crystal display apparatus 10 obtains a pointed position, pointed by the operating device 20, in the coordinate system of the display screen, based on (i) the information that is received from the operating device 20 and (ii) positional information and identification information of each of the light-emitting areas that are displayed on the display screen.

The light-emitting areas are displayed in the display screen in the way explained above. Accordingly, compared with a conventional case in which the light-emitting areas are provided outside the display screen, the light-emitting areas are more likely to be in a range of the captured image captured by the operating device 20, even in a case where a distance between the display screen and the operating device 20 is short. This extends a range in which the pointed position on the display screen can be appropriately calculated. Further, it also becomes easy to calculate the coordinates of the pointed position in the coordinate system of the display screen based on a position of each of the light-emitting areas in the coordinate system of the display screen and a relative position of each of the light-emitting areas with respect to the pointed position in the coordinate system of the captured image.

Moreover, the light-emitting areas in the captured image can be distinguished from one another. This makes it possible to calculate a rotation angle around an axis that is in a direction in which the operating device 20 captures an image at the time when the image is captured. As a result, it becomes possible to appropriately detect coordinates of the pointed position in the coordinate system of the display screen.

In the present embodiment, brightness (luminance) of each of the light-emitting areas is varied with the use of a different driving voltage supplied to the sub-pixels SPIr of Ir that correspond to each of the light-emitting areas, so that each of the light-emitting areas is displayed in a distinguishable manner. The display method of the light-emitting areas is not limited to this. The display method may be any method as long as, in the method, each of light-emitting areas is distinguished based on a captured image.

Figure 10:
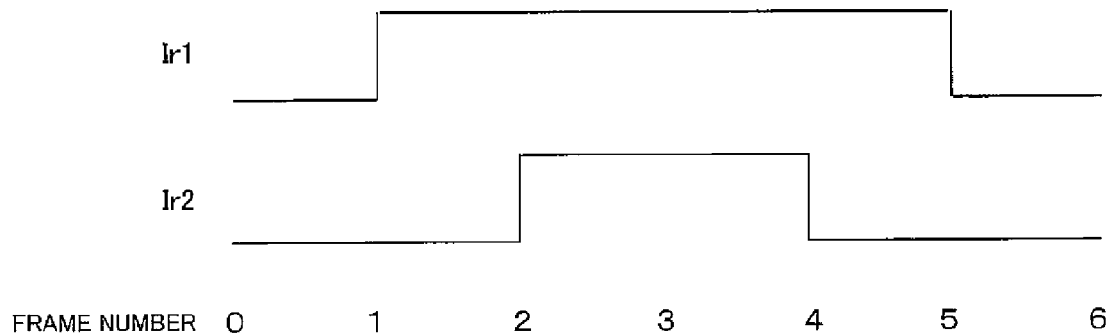
FIG. 10 is a waveform chart illustrating another example of a waveform of a driving voltage that is supplied to each of the sub-pixels of Ir in the block corresponding to the light-emitting areas Ir1 and Ir2 in FIG. 7.

For example, as illustrated in FIG. 10, a light emitting time (4 frame periods in FIG. 10) of the light-emitting area Ir1 may be arranged to be different from a light emitting time (2 frame periods in FIG. 10) of the light-emitting area Ir2. That is, a time (the number of frames) for which the sub-pixels corresponding to the light-emitting area Ir1 is ON may be arranged to be different from a time (the number of frames) for which the sub-pixels corresponding to the light-emitting area Ir2 is ON. This makes it possible to distinguish each of the light-emitting areas based on a result of calculating, based on the captured image, an average value of brightness (luminance) of each of the light-emitting areas in a predetermined period (in a predetermined frame period).

Figure 11:
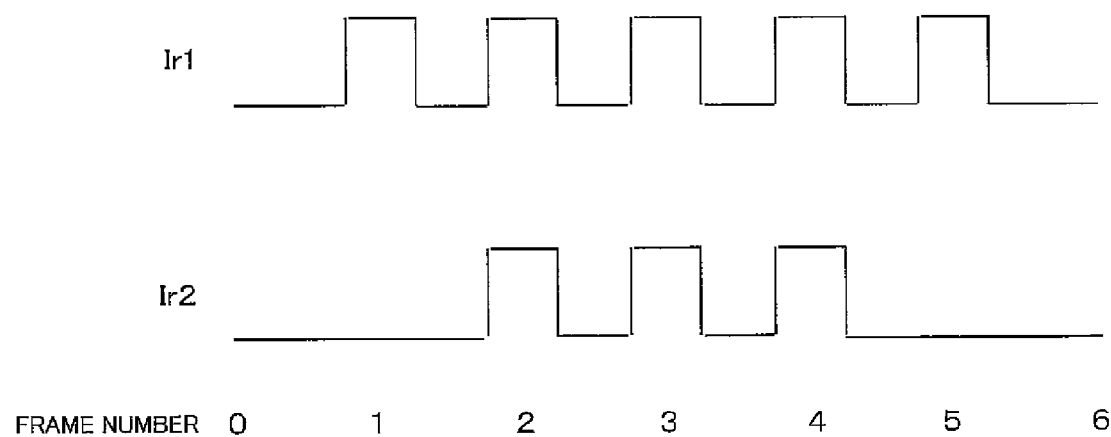
FIG. 11 is a waveform chart illustrating still another example of a waveform of a driving voltage that is supplied to each of the sub-pixels of Ir in the block corresponding to the light-emitting areas Ir1 and Ir2 in FIG. 7.

Alternatively, as illustrated in FIG. 11, driving voltages for displaying the light-emitting areas may be pulse waves, and the number of pulses may be varied for each of the light-emitting areas. That is, the number of switching ON and OFF of the sub-pixels of Ir corresponding to the light-emitting area Ir1 may be arranged to be different from the number of switching ON and OFF of the sub-pixels of Ir corresponding to the light-emitting area Ir2. This makes it possible to distinguish each of the light-emitting areas by detecting, based on the captured image, the number of pulses (the number of switching ON and OFF) of each of the light-emitting areas in a predetermined period (a predetermined frame time) or calculating, based on the captured image, an average value of brightness (luminance) in a predetermined period.

Figure 12:
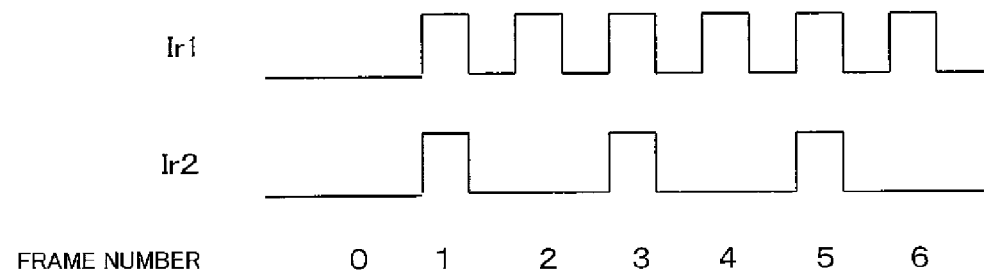
FIG. 12 is a waveform chart illustrating yet another example of a waveform of a driving voltage that is supplied to each of the sub-pixels of Ir in the block corresponding to the light-emitting areas Ir1 and Ir2 in FIG. 7.

As a further alternative, as illustrated in FIG. 12, driving voltages for displaying the light-emitting areas may be pulse waves, and a period or a waveform pattern (a light-emission pattern, a flashing pattern) of a pulse wave of the driving voltage may be varied for each of the light-emitting areas. In this case, each of the light-emitting areas can be distinguished by detecting, based on the captured image, the period of the pulse or the waveform pattern of each of the light-emitting areas.

The present embodiment gives an explanation of an arrangement that employs a metal-halide lamp as the light source 61. However, an arrangement of the light source 61 is not limited to this. The light source 61 may have any arrangement as long as a light source is arranged to emit (i) light, whose wavelength is in a visible region, for display of an image in accordance with image data and (ii) light, whose wavelength is in an infrared region, for display of light-emitting areas. For example, a light source that emits light having a wavelength in a visible region and a light source that emits light having a wavelength in an infrared region may be used in combination. In this case, for example, respective LEDs of R, G, and B and an infrared LED are used in combination. Alternatively, a white LED and an infrared LED may be used in combination. In a case where LEDs are used in combination, the light emitted from each of the LEDs may be arranged to enter the display section 11 by using a microlens array. (e.g., Non-Patent Document 2: Editorial supervisor: Tatuo Uchida, "Illustrated: All About Electronic Display", Kougyou Chousakai Publishing Inc., Oct. 30, 2006, pp. 92-95). The backlight unit 60 may be any one or a combination of a side-light type backlight and a direct backlight.

Figure 13:
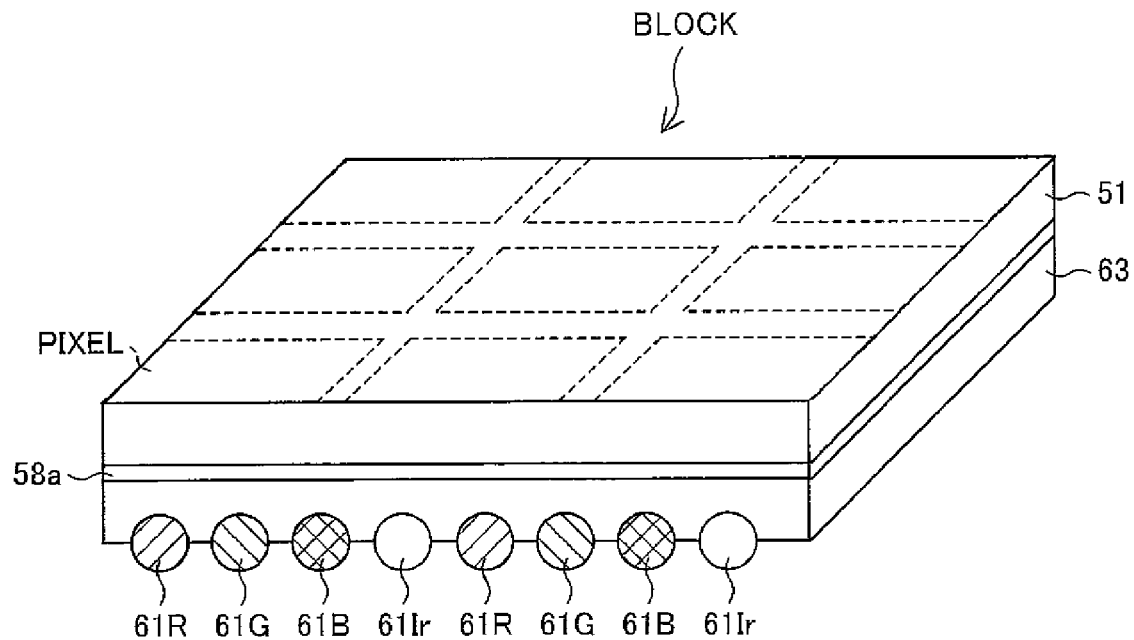
FIG. 13 is a perspective view illustrating a modified example of a backlight unit that is provided in the display apparatus as illustrated in FIG. 3.

Alternatively, after the display screen is divided into a plurality of blocks, the light source 61 may be provided to each block. FIG. 13 is a perspective view illustrating an example of an arrangement in a case where each block made of 3×3 pixels is provided with two light sources 61R each made of an LED of R color, two light sources 61G each made of an LED of G color, two light sources 61B each made of an LED of B color, and two light sources 61Ir each made of an LED of Ir color. For the purpose of simplifying the explanation, FIG. 13 shows an arrangement in which one block is made of 3×3 pixels. However, a size of the block is not limited to this. Further, an arrangement of the example illustrated in FIG. 13 includes a light guide plate 63. The light guide plate 63 diffuses the light emitted from the LEDs of R, G, B, and Ir and guides thus diffused light to each of the pixels in the block, so that color unevenness is inhibited and a uniform luminance is obtained. Other than the arrangement of the backlight unit, the same arrangement as the arrangement illustrated in FIG. 5 may be employed. Alternatively, in the arrangement of FIG. 13, a white LED may be used instead of the LEDs of R, G, and B.

Figure 14:
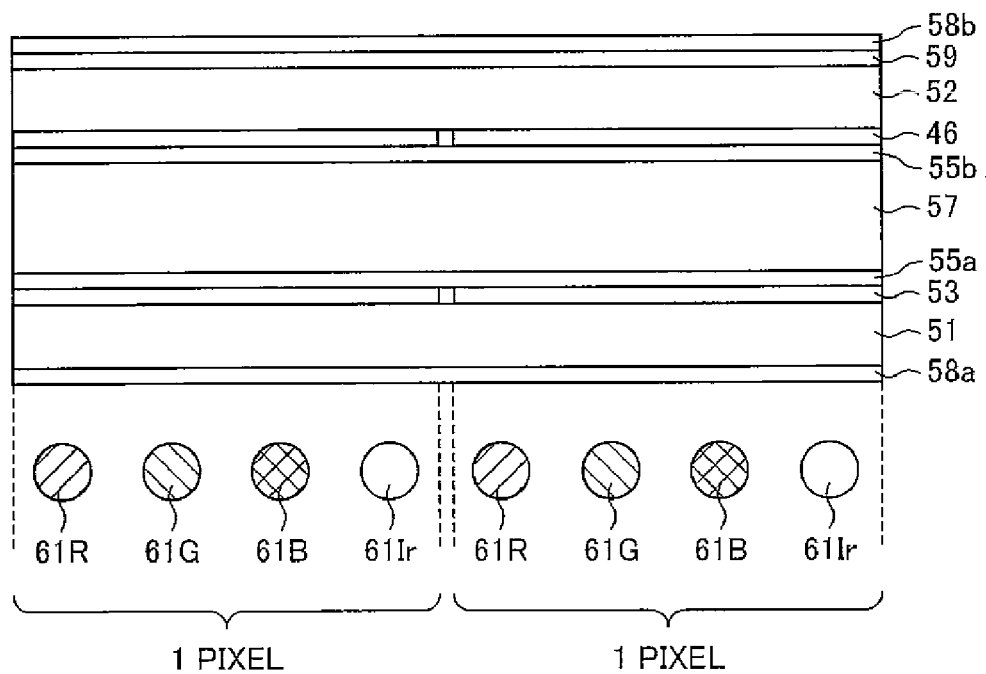
FIG. 14 is a perspective view illustrating a modified example of a backlight unit that is provided in the display apparatus as illustrated in FIG. 3.

As a further alternative, the light source 61 may be provided to each pixel. In this case, each pixel is provided with respective LEDs of R, G, B, and Ir and the image display is carried out in a field sequential method. FIG. 14 is a cross sectional view illustrating an example of an arrangement of each pixel in a case where the field sequential method is employed.

In the example as illustrated in FIG. 14, (i) light sources 61R, 61G, 61B, and 61Ir of respective colors R, G, B, and Ir, (ii) a polarization plate 58a, (iii) a wiring layer 53, (iv) an alignment film 55a, (v) a glass substrate 51, (vi) a liquid crystal layer 57, (vii) an alignment film 55b, (viii) a counter electrode 46, (ix) a glass substrate 52, (x) an optical compensation plate 59, and (xi) a polarization plate 58b are provided from a side provided with a backlight in this order. In the case of employing the field sequential method, the light sources of respective colors are sequentially lighted for performing a display. Accordingly, it is not necessary provide a sub-pixel, and a color filter is dispensable.

The optical compensation plate 59 is arranged by overlapping three uniaxial retardation films in a manner such that the optical axes of the uniaxial retardation films intersect orthogonally to one another. Thus arranged optical compensation plate 59 performs three-dimensional optical compensation. Because this optical compensation plate 59 is provided, the arrangement of FIG. 14 is operated in an OCB (Optically Compensated Bend) system.

In this case, in each pixel, one frame period (1/60 second) is divided into four divisional sections and the LEDs of colors R, G, B, and Ir are sequentially driven (time-sharing drive) in not more than 1/240 second for each of the LEDs. That is, after a driving voltage of a field of R is written in, a backlight of R is lighted. Thereafter, in the same manner, a backlight of G is light after a driving voltage of a field of G is written in, and a backlight of B is lighted after a driving voltage of a field of B is written in. In this way, an image is displayed. In the pixels displaying a light-emitting area, a driving voltage is supplied to a thin film transistor so that Ir is transmitted. Then, the backlight of Ir is lighted. Alternatively, the display screen is divided into a plurality of blocks and the backlight may be lighted sequentially for each block.

In the present embodiment, the image processing module 24 and the controlling section 26 are provided as different functional blocks. However, the image processing module 24 and the controlling section 26 may be realized as single operation means.

In the present embodiment, the operating device 20 calculates (i) relative positions of light-emitting areas with respect to a pointed position in the coordinate system of a captured image (i.e., relative positions of the light-emitting areas with respect to the center of the captured image, or a relative position, with respect to the center of the captured image, of a point (e.g., a midpoint between the light-emitting areas) that is uniquely determined in accordance with the positions of the light-emitting areas) and (ii) a distance between the light-emitting areas in the coordinate system of the captured image. However, the present embodiment is not limited to this. For example, it is also possible to adopt an arrangement in which image data of a captured image that is captured by the image sensing device 23 or data of respective coordinates of a pointed position and light-emitting areas in the coordinate system of the captured image is transmitted to the liquid crystal display apparatus 10, so that the liquid crystal display apparatus 10 calculates (i) relative positions of light-emitting areas with respect to a pointed position in the coordinate system of the captured image and (ii) the distance between the light-emitting areas in the coordinate system of the captured image.

In the present embodiment, the liquid crystal display apparatus 10 calculates a pointed position in the coordinate system of the display screen, based on (i) identification information of each of light-emitting areas that are detected in a captured image by the operating device 20, (ii) relative positions of the light-emitting areas with respect to a pointed position in the coordinate system of the captured image, and (ii) a distance between the light-emitting areas in the coordinate system of the captured image. However, the present embodiment is not limited to this. For example, it is possible to adopt an arrangement in which (i) the identification information of each of the light-emitting areas (e.g., actual luminance of each of the light-emitting areas) and (ii) the distance Ld between the light-emitting areas or the positions (coordinates) of the light-emitting areas in the coordinate system of the display screen are transmitted in advance from the communication module 13 of the liquid crystal display apparatus 10 to the operating device 20, and then the image processing module 24 of the operating device 20 calculates a pointed position in the coordinate system of the display screen based on (i) the information received from the liquid crystal display apparatus 10, (ii) identification information of each of light-emitting areas extracted from a captured image, (iii) relative positions of the light-emitting areas with respect to a pointed position in the coordinate system of the captured image, and (iv) a distance between light-emitting areas extracted from the captured image. In this case, the calculated result of the pointed position in the coordinate system of the display screen should be transmitted from the operating device 20 to the liquid crystal display apparatus 10.

The present embodiment gives an explanation on an arrangement in which two light-emitting areas are displayed on the display screen. However, the present embodiment is not limited to this. Instead, three or more light-emitting areas can be displayed on the display screen. In the case where three or more light-emitting areas are displayed, as in a case where two light-emitting areas are displayed, the light-emitting areas should be displayed in a method that allows the light-emitting areas to be distinguished from one another. Further, a rotation angle of the operating device 20 at the time when an image is captured should be calculated based on a positional relation of the light-emitting areas in the coordinate system of the display screen and a positional relation of the light-emitting areas in the coordinate system of the captured image.

Figure 15A:
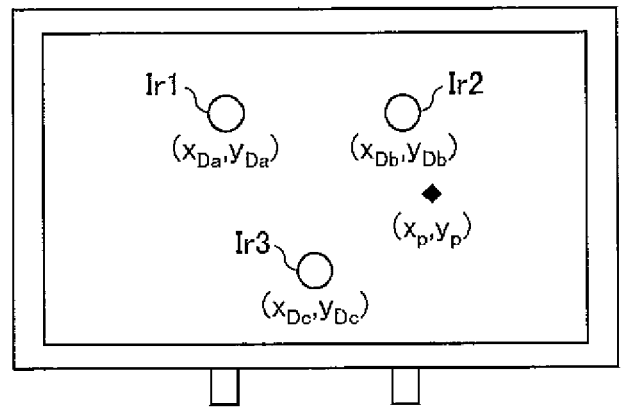
FIG. 15(a) is an explanatory diagram illustrating another example of infrared-light-emitting areas that are displayed on the display section of the display apparatus as illustrated in FIG. 3.
Figure 15B:
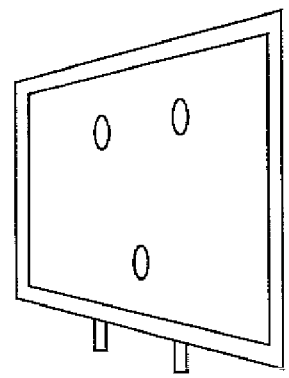
FIG. 15(b) is an explanatory diagram illustrating an image capture direction (a direction in which an image is captured by the operating device) of the operating device with respect to a display surface of the display apparatus.
Figure 15C:
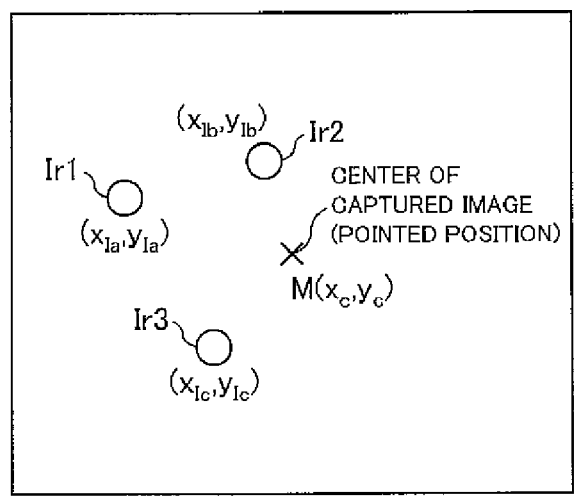
FIG. 15(c) is an explanatory diagram illustrating a captured image in a case where an image of the display section as illustrated in FIG. 15(a) is captured in an image capture direction as illustrated in FIG. 15(b) with the use of an image sensing device that is provided in the operating device.

The following describes an example of how a pointed position on a display screen is calculated in a case where three light-emitting areas are displayed on the display screen. FIG. 15(a) is an explanatory diagram illustrating one example in which three light-emitting areas Ir1, Ir2, and Ir3 are displayed on the display section 11 of the liquid crystal display apparatus 10. FIG. 15(c) is an explanatory diagram illustrating one example of a captured image obtained in a case where the image sensing device 23 of the operating device 20 captures, at an oblique viewing angle as shown in FIG. 15(b), an image of the display section 11 illustrated in FIG. 15(a).

As illustrated in FIG. 15(c), it is assumed that: $(x_c, y_c)$ represents coordinates of a pointed position (in this case, a center of the captured image) in the coordinate system of the captured image; and $(x_{Ia}, y_{Ia})$, $(x_{Ib}, y_{Ib})$, and $(x_{Ic}, y_{Ic})$ represent coordinates of the light-emitting areas Ir1, Ir2, and Ir3 in the coordinate system of the captured image, respectively. As illustrated in FIG. 15(a), it is assumed that: $(x_{Da}, y_{Da})$, $(x_{Db}, y_{Db})$, and $(x_{Dc}, y_{Dc})$ represent coordinates of the light-emitting areas Ir1, Ir2, and Ir3 in the coordinate system of the display screen, respectively; and (xp, yp) represents coordinates of a pointed position in the coordinate system of the display screen.

Figure 16A:
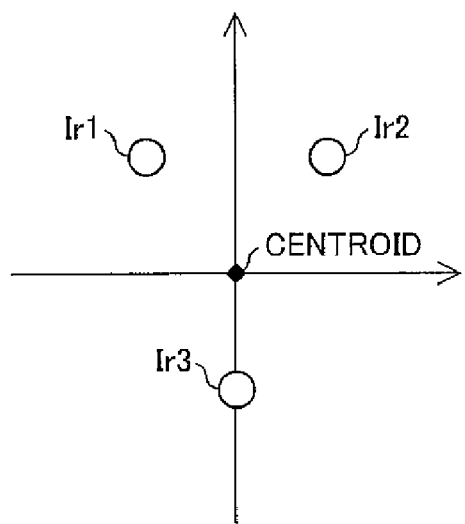
FIG. 16(a) is an explanatory diagram illustrating a relation between (i) infrared-light-emitting areas displayed on the display section of the display apparatus as illustrated in FIG. 3 and (ii) a centroid of the infrared-light-emitting areas.

First, it is determined how the light-emitting areas in the coordinate system of the captured image is correlated with the light-emitting areas in the coordinate system of the display screen, respectively. As illustrated in FIG. 16(a), according to the present embodiment, in the coordinate system of the display screen, the light-emitting area Ir1 is in a second quadrant; the light-emitting area Ir2 is in a first quadrant; and the light-emitting area Ir3 is on a borderline between a third quadrant and a fourth quadrant (i.e., on a y-axis), where it is assumed that a centroid of the three light-emitting areas coincides with an origin of coordinates (0, 0).

Figure 16B:
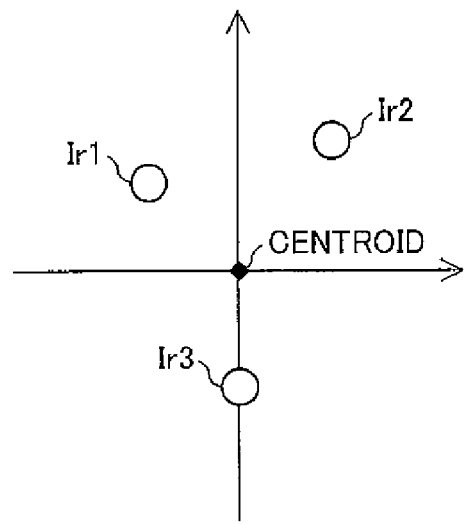
FIG. 16(b) is an explanatory diagram illustrating a relation between (i) the infrared-light-emitting areas and (ii) a centroid of the infrared-light-emitting areas in an captured image that is obtained by capturing an image of the display section as illustrated in FIG. 16(a) with the use of an image sensing device provided in the operating device.

As illustrated in FIG. 16(b), similarly, in the coordinate system of the captured image, the light-emitting area Ir1 is in a second quadrant; the light-emitting area Ir2 is in a first quadrant; and the light-emitting area Ir3 is on a borderline between a third quadrant and a fourth quadrant, where it is assumed that a centroid of the three light-emitting areas coincides with an origin of coordinates (0, 0).

A matrix D and a matrix I are defined as below.

$$D = \begin{pmatrix} x_{Da} & y_{Da} & 1 \\ x_{Db} & y_{Db} & 1 \\ x_{Dc} & y_{Dc} & 1 \end{pmatrix}$$

$$I = \begin{pmatrix} x_{Ia} & x_{Ib} & x_{Ic} \\ y_{Ia} & y_{Ib} & y_{Ic} \\ 1 & 1 & 1 \end{pmatrix}$$

A determinant M that satisfies the equation D=MI is expressed as: $M=DI^{-1}$. Therefore, a pointed position (xp, yp) in the coordinate system of the display screen is calculated by the following determinant.

$$(xp \quad yp \quad 1) = M \begin{pmatrix} xc \\ yc \\ 1 \end{pmatrix}$$

This calculation may be carried out by the image processing module 24 or the controlling section 26 of the operating device 20, or by the display controlling section 31 of the liquid crystal display apparatus 10.

In this way, it is possible to appropriately calculate a position, on the display screen, which is pointed by the operating device 20, by calculating the position based on the three or more light-emitting areas, not only in a case where the display screen is pointed by the operating device 20 from the front side of the display screen, but also in a case where the display screen is pointed by the operating device 20 at an oblique viewing angle, as illustrated in FIG. 15(b), for example.

Second Embodiment

Another embodiment of the present invention is explained below. For convenience of an explanation, members given the same reference numerals as the members explained in the First Embodiment respectively have identical functions and the explanations thereof are omitted.

Figure 17:
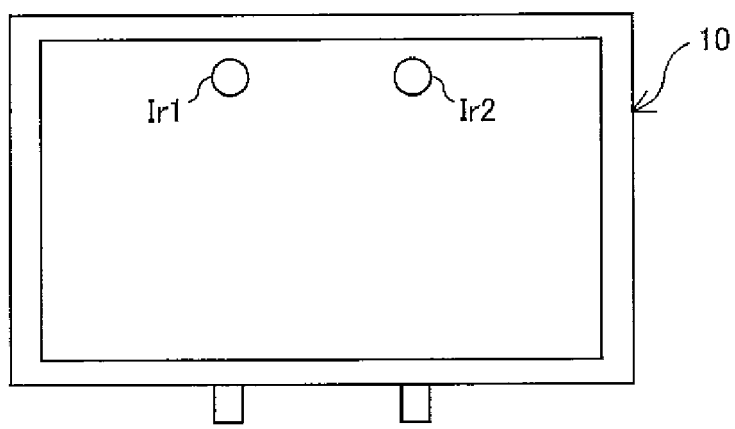
FIG. 17 is an explanatory diagram illustrating one example of infrared-light-emitting areas that are displayed on the display screen of the display apparatus in a display system according to another embodiment of the present invention.
Figure 18:
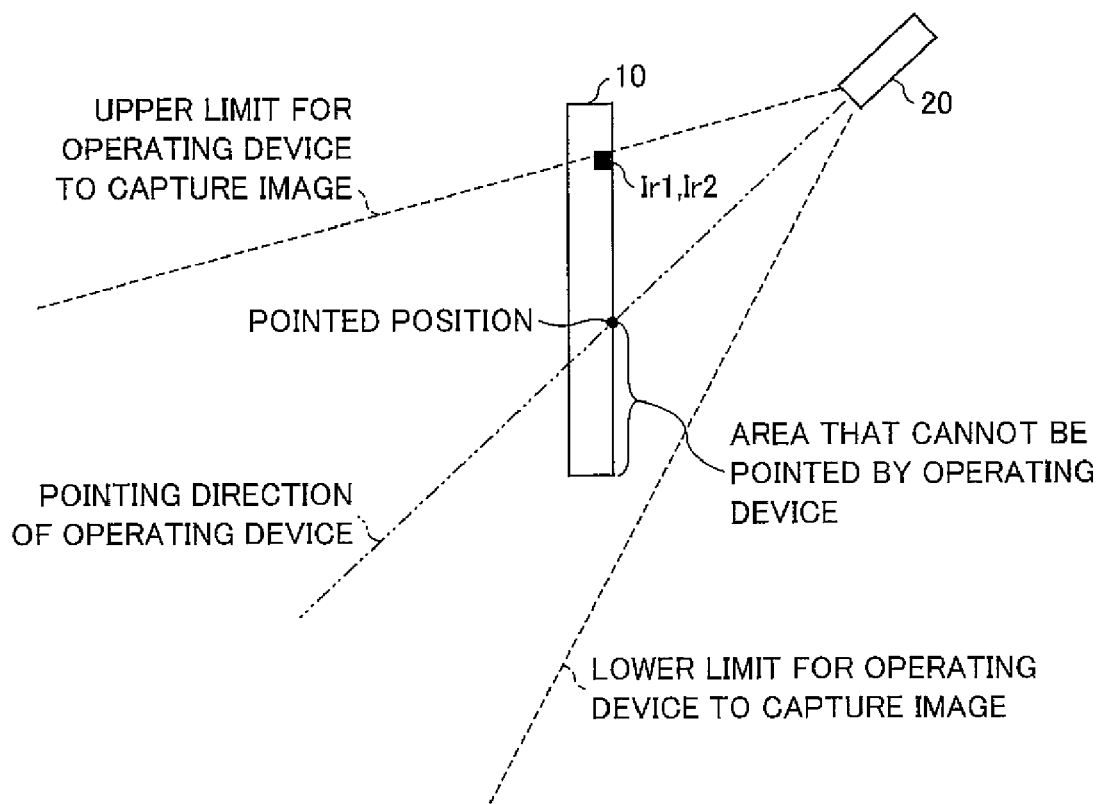
FIG. 18 is an explanatory diagram illustrating an example of a range in which the operating device can point a position on the display screen from a position close to the display screen in a case where infrared-light-emitting areas are displayed in the position as illustrated in FIG. 17.
Figure 19:
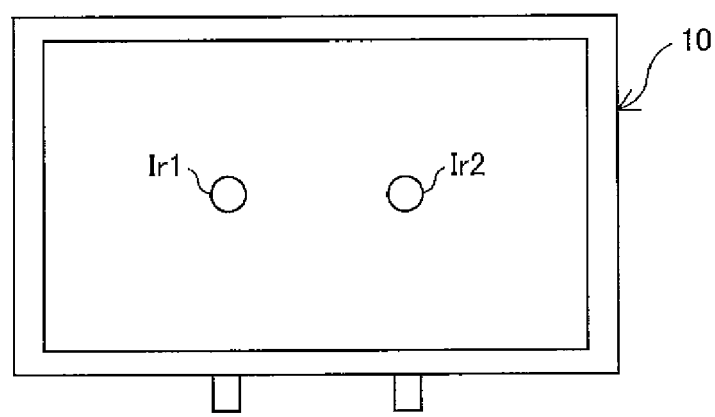
FIG. 19 is an explanatory diagram illustrating another example of infrared-light-emitting areas that are displayed on the display screen of the display apparatus in the display system of the another embodiment of the present invention.
Figure 20A:
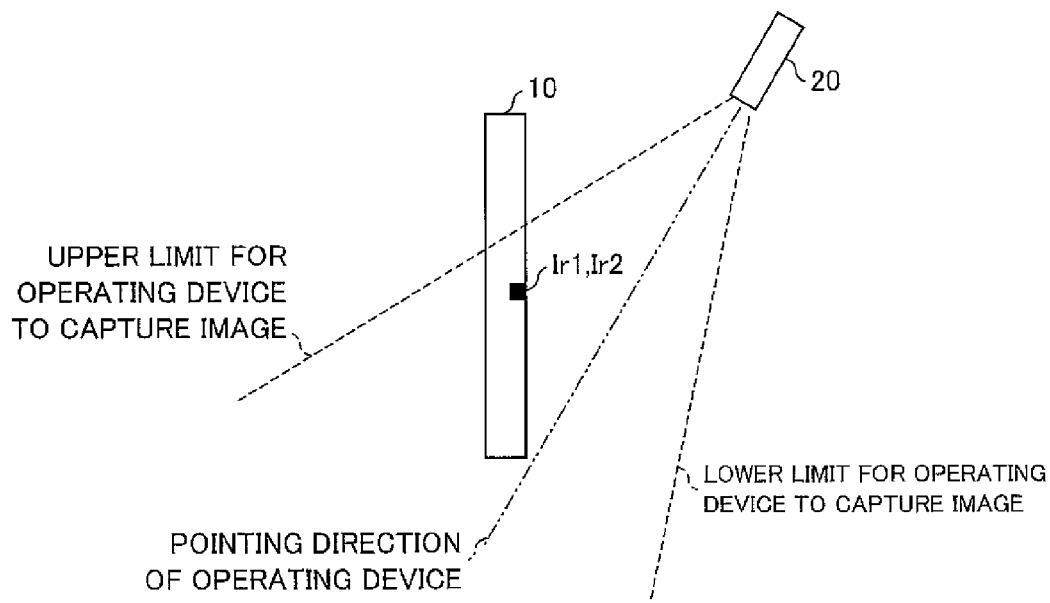
FIGS. 20(a) and 20(b) are explanatory diagrams each illustrating an example of a range in which the operating device can point a position on the display screen from a position close to the display screen in a case where infrared-light-emitting areas are displayed at positions as shown in FIG. 19.
Figure 20B:
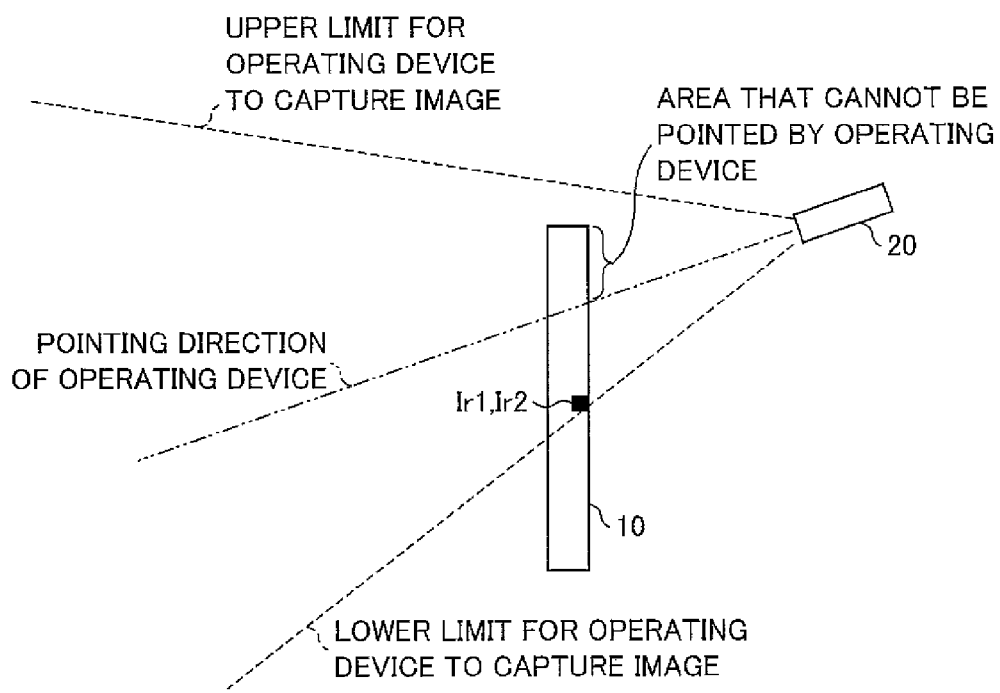

FIGS. 17 and 19 are explanatory diagrams each illustrating an example of light-emitting areas that are displayed on a display screen of a liquid crystal display device 10 in a display system 1 as illustrated in the first embodiment. FIG. 18 is an explanatory diagram illustrating an example of a range in which an operating device 20 can point a position on the display screen from a position close to the display screen in a case where the light-emitting areas are displayed at positions as illustrated in FIG. 17. FIGS. 20(a) and 20(b) are explanatory diagrams each illustrating a range in which the operating device 20 can point a position on the display screen from a position close to the display screen in a case where light-emitting areas are displayed at positions as illustrated in FIG. 19.

In a case where the light-emitting areas are displayed at the positions as illustrated in FIG. 17, as illustrated in FIG. 18, an area that cannot be pointed by the operating device 20 is produced in a lower section of the display screen. In a case where the light-emitting areas are displayed at the positions as illustrated in FIG. 19, as illustrated in FIG. 20(a), all the area in the lower section of the display screen can be pointed by the operating device 20. However, as illustrated in FIG. 20(b), an area that cannot be pointed by the operating device 20 is produced in an upper section of the display screen.

As explained above, when the light-emitting areas are displayed on the display screen as in the first embodiment, the light-emitting areas are more likely to be included in a range an image captured by the operating device 20 even in a case where a distance between the operating device 20 and the display screen is short. This extends a range in which the operating device 20 can point a position on the display screen. However, in a case where the distance between the operating device 20 and the display screen are further shortened, an area that cannot be pointed by the operating device 20 is produced on the display screen.

In order to solve this problem, in the present embodiment, (i) a pointed position in a coordinate system of the display screen and (ii) a distance between the display screen and the operating device 20 are calculated based on a result of capturing an image by the operating device 20. According to the result of calculating (i) the pointed position and (ii) the distance, display positions of the light-emitting areas are controlled. As a result, even in a case where the distance between the operating device 20 and the display screen is very short, an area on the display screen which area can be pointed by the operating device 20 can be further extended.

Figure 21:
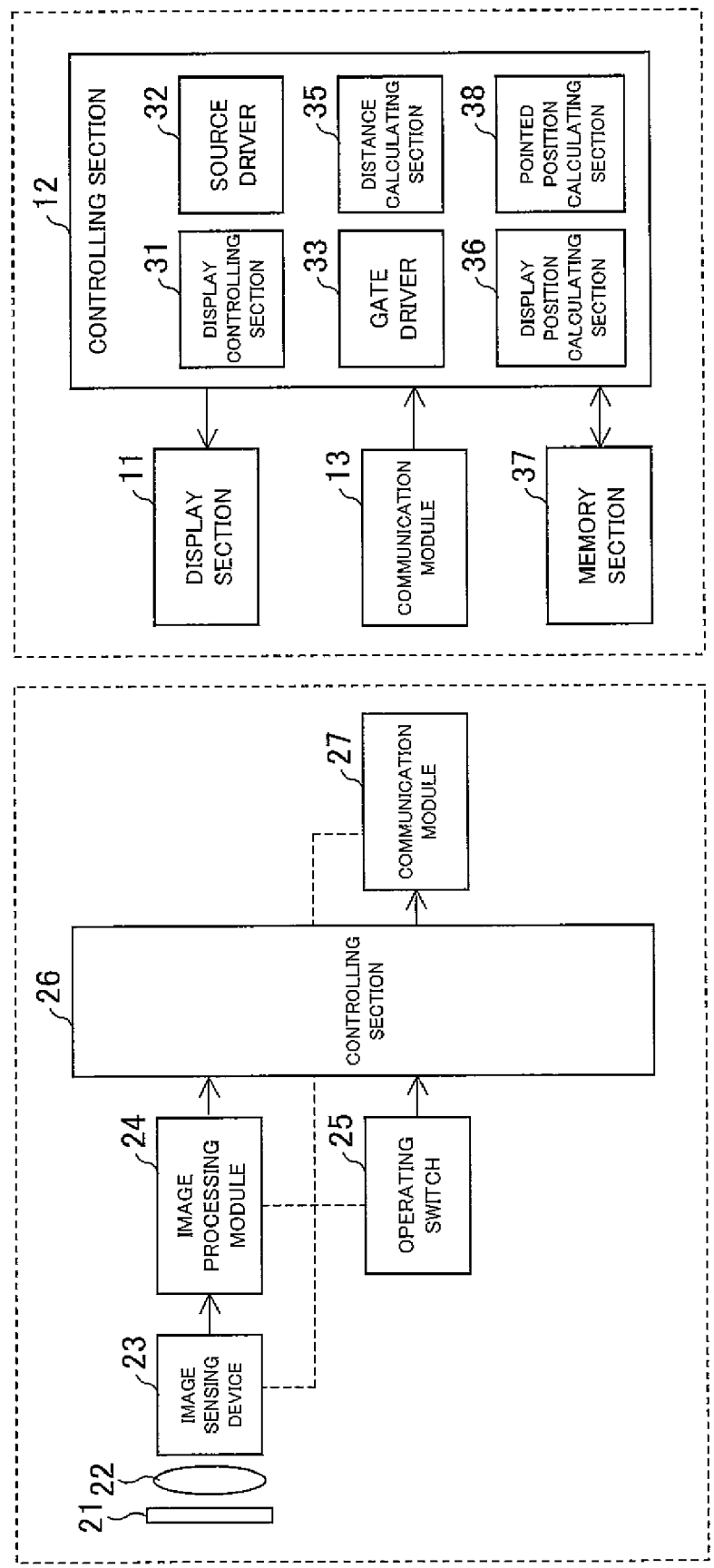
FIG. 21 is a block diagram schematically illustrating an arrangement of a display system according to the another embodiment of the present invention.

FIG. 21 is a block diagram schematically illustrating an arrangement of a display system 1b of the present embodiment. As illustrated in FIG. 20, in the display system 1b of the present embodiment, a liquid crystal display apparatus 10 includes a distance calculating section 35, a display position calculating section 36, and a memory section 37, in addition to an arrangement of a display system 1 of the first embodiment. The distance calculating section 35 and the display position calculating section 36 are included in a controlling section 12.

The distance calculating section 35 calculates a distance between light-emitting areas that are being displayed on a display screen.

The display position calculating section 36 calculates altered display positions of the light-emitting areas based on (i) a position in the coordinate system of the display screen, which position is calculated, as the position pointed by the operating device 20, by the display controlling section 31, (ii) a distance, calculated by the distance calculating section 35, between the light-emitting areas that are being displayed on the display screen, and (iii) a distance between light-emitting areas in a captured image that is received from the operating device 20.

As illustrated in FIG. 22, the memory section 37 stores in advance a lookup table in which (i) a distance between light-emitting areas which are being displayed in the coordinate system of the display screen, (ii) a distance between light-emitting areas in the coordinate system of the captured image, and (iii) an altered (set) distance between the light-emitting areas are correlated with one another. The altered distance, in the lookup table, between the light-emitting areas is set to become shorter as the distance between the display screen and the operating device 20 becomes shorter.

The display position calculating section 36 refers to the lookup table so as to obtain an altered distance between the light-emitting areas which altered distance corresponds to a distance between the light-emitting areas that are being displayed on the display screen and a distance between the light-emitting areas in a captured image. The display position calculating section 36 then calculates display positions of the light-emitting areas so that the light-emitting areas are displayed, according to the altered and obtained distance between the light-emitting areas, in the vicinity of the position in the coordinate system of the display screen, which position is calculated, as the position pointed by the operating device 20, by the display controlling section 31 based on the positions of the light-emitting areas that are being displayed on the display screen. More specifically, the display position calculating section 36 calculates display positions of the light-emitting areas, so that a midpoint (or a centroid) of the light-emitting areas that are obtained after alteration of the display positions of the light-emitting areas agrees with the position that is calculated, as the position pointed by the operating device 20, based on the light-emitting areas that are displayed on the display device before the alteration of the display positions. Then, the positions of the light-emitting areas to be displayed on the display screen are altered to the positions thus calculated.

Figure 23:
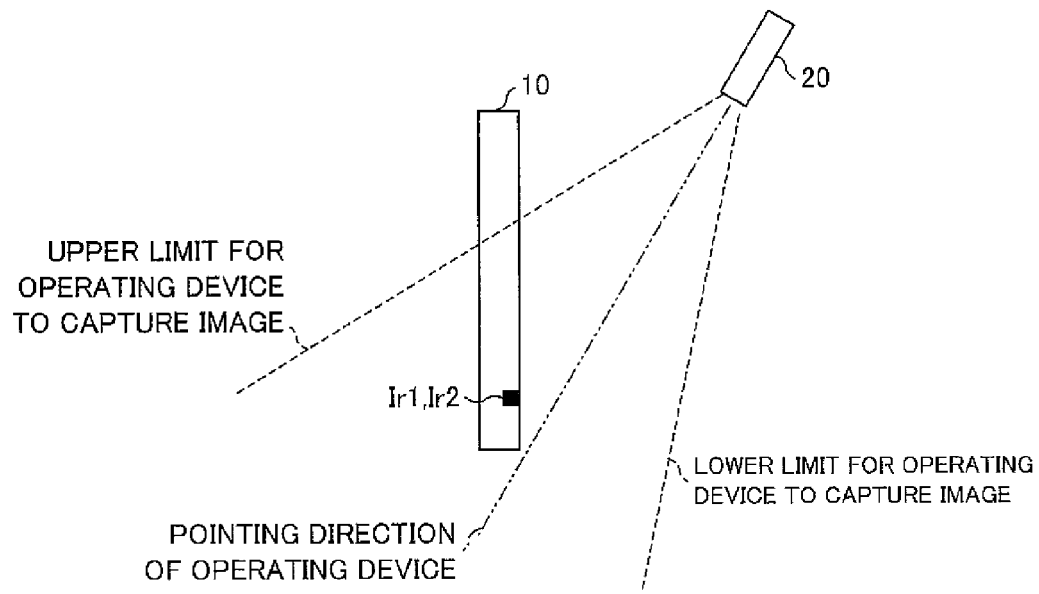
Figure 23:
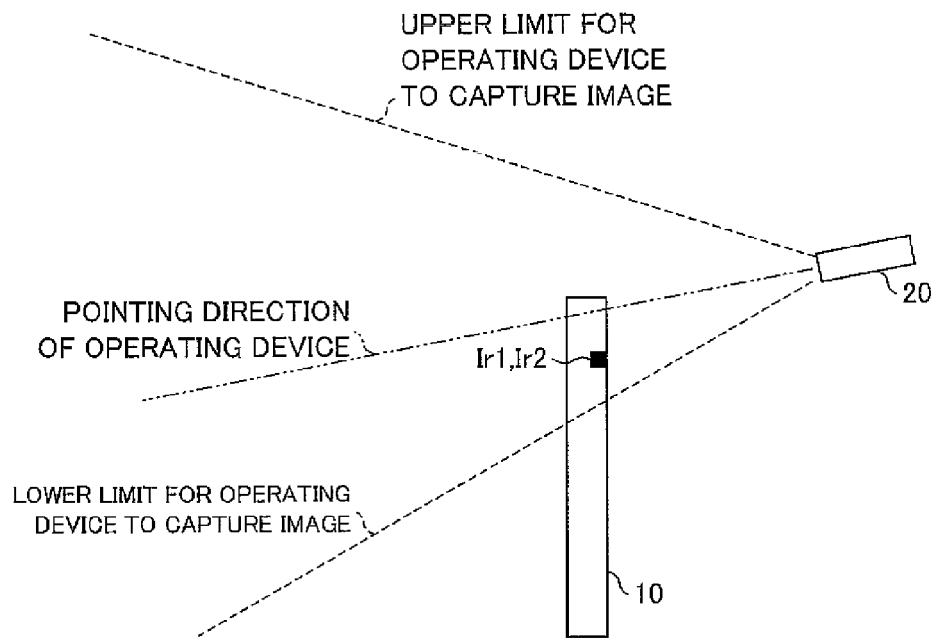

According to the display system 1b of the present embodiment, a position pointed by the operating device 20 is calculated, based on the positions of the light-emitting areas that are being displayed on the display screen, and the display positions of the light-emitting areas are altered to positions in an area in the vicinity of the position thus calculated. This causes, as illustrated in FIGS. 23(a) and 23(b), the light-emitting areas to be always displayed in the vicinity of the position that is pointed by the operating device 20. As such, it is possible to prevent a failure in detection of a position pointed by the operating device 20 for the reason that the light-emitting areas on the display screen are not within a range in which the operating device 20 can capture an image in a case where the position that is pointed by the operating device 20 is changed from one to another.

Figure 24A:
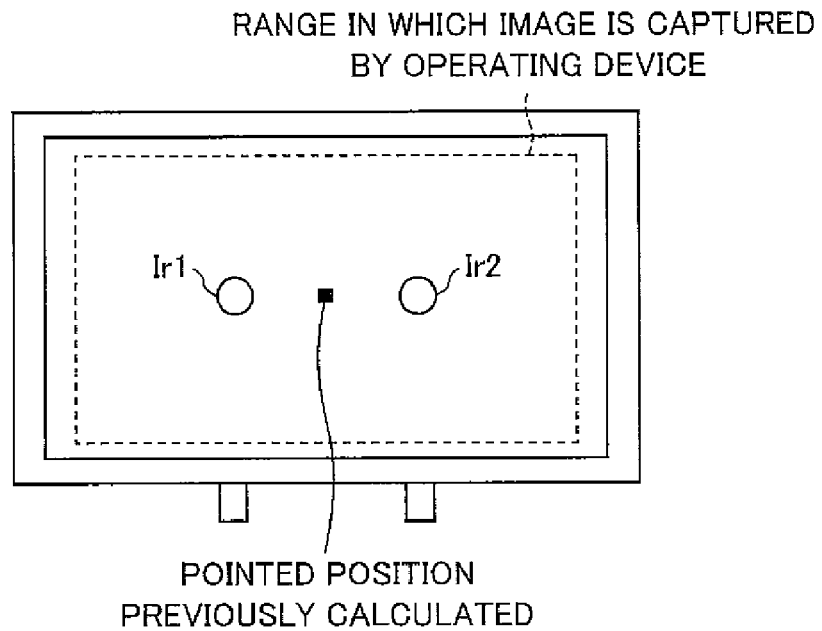
FIG. 24(a) is an explanatory diagram illustrating an example of altered display positions of light-emitting areas in a case where a distance between the display screen and the operating device of the display system is long in the display system according to the another embodiment of the present invention.
Figure 24B:
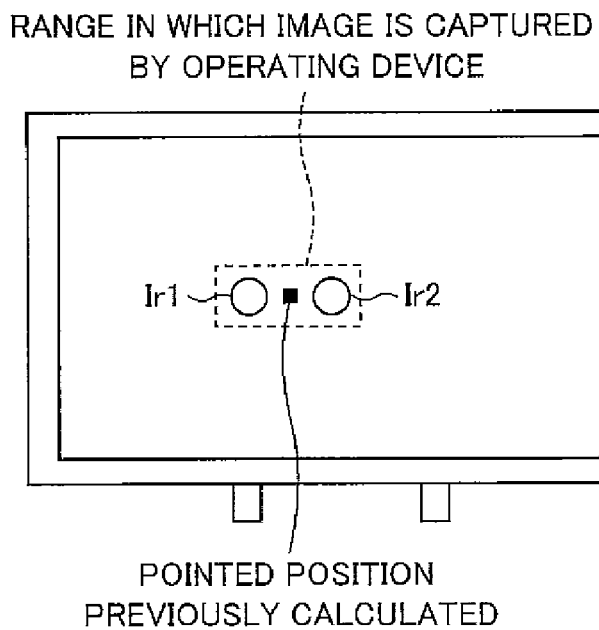
FIG. 24(b) is an explanatory diagram illustrating an example of altered display position of light-emitting areas in a case where a distance between the display screen and the operating device of the display system is short in the display system according to the another embodiment of the present invention.
Figure 25A:
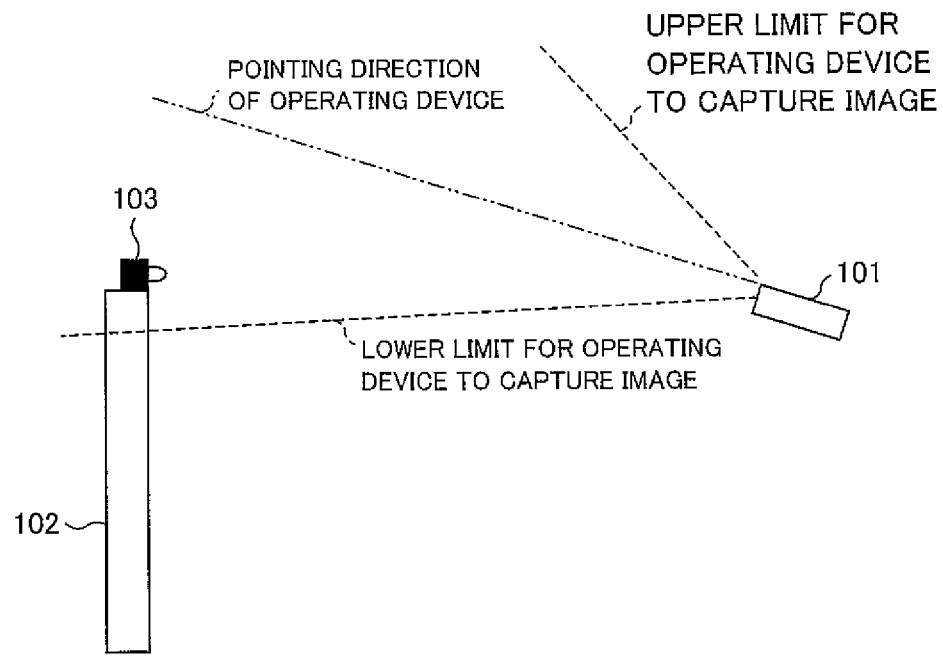
FIGS. 25(a) and 25(b) are explanatory diagrams each illustrating a relation of (i) a distance between the operating device and the display apparatus and (ii) a range in which a position that is pointed by the operating device can be detected, in the display system of the conventional technique.
Figure 25B:
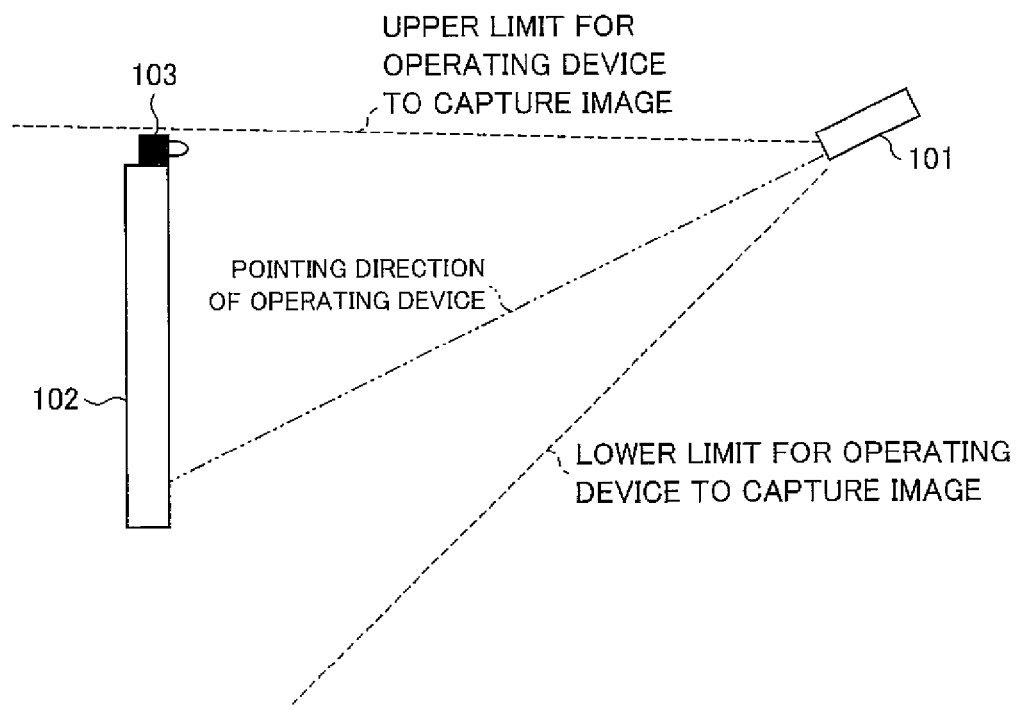
Figure 26:
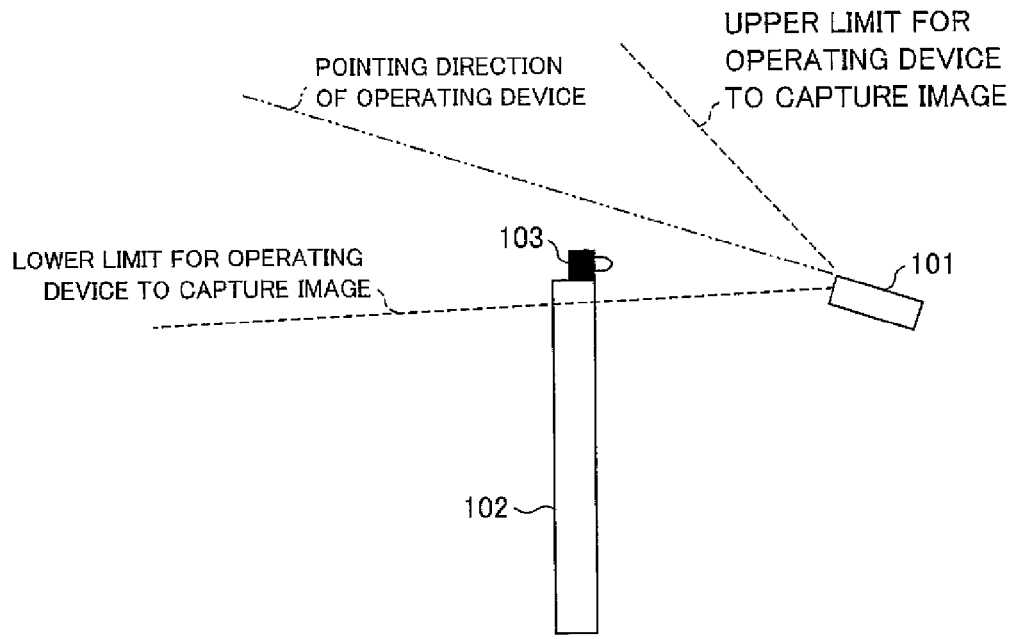
FIGS. 26(a) and 26(b) are explanatory diagrams each illustrating a relation of (i) a distance between an operating device and a display apparatus and (ii) a range in which a position that is pointed by the operating device can be detected, in a display system according to a conventional technique.
Figure 26:
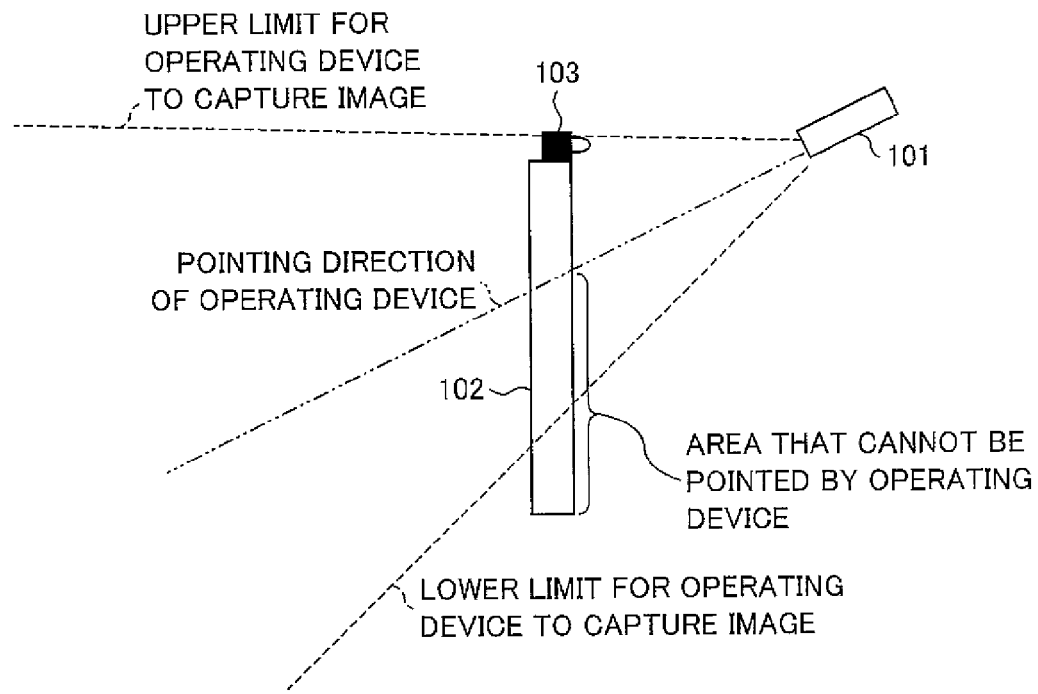
Figure 27A:
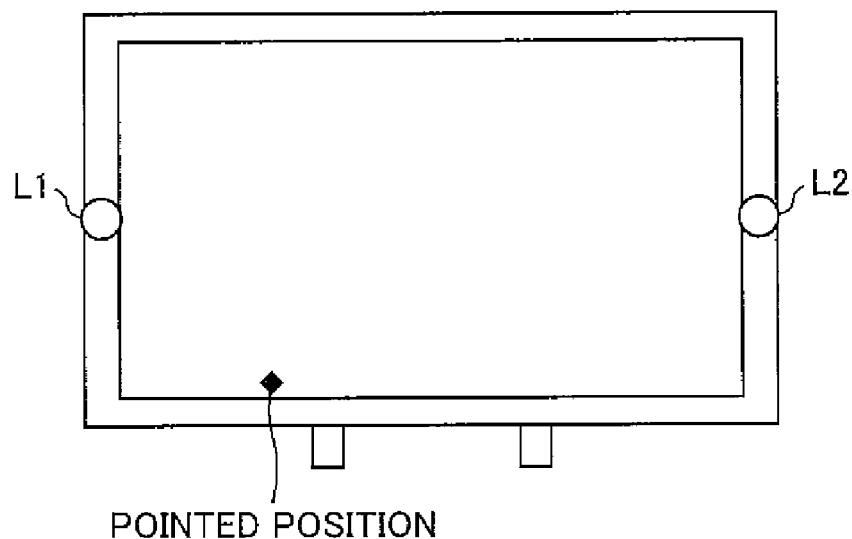
FIG. 27(a) is an explanatory diagram illustrating one example of positions of infrared-light-emitting areas and a pointed position in a conventional display system.
Figure 27B:
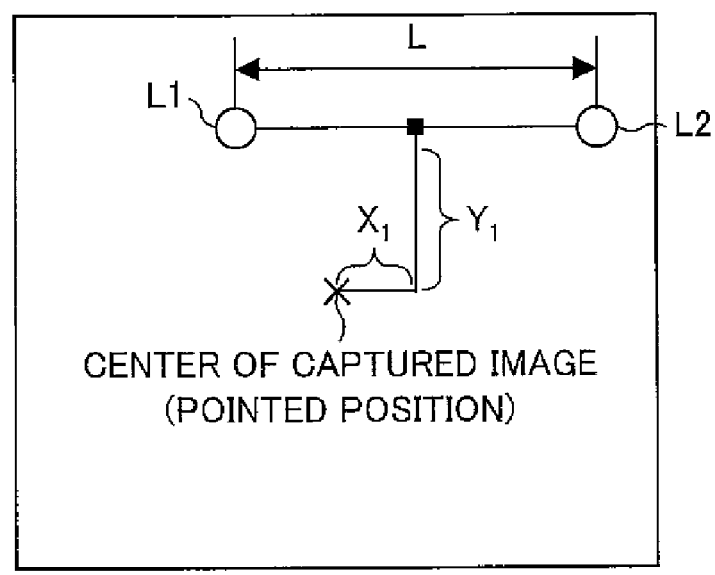
FIG. 27(b) is an explanatory diagram illustrating a captured image in a case where an image of the infrared-light-emitting areas and the pointed position are captured by an operating device that is not turned upside down.
Figure 28A:
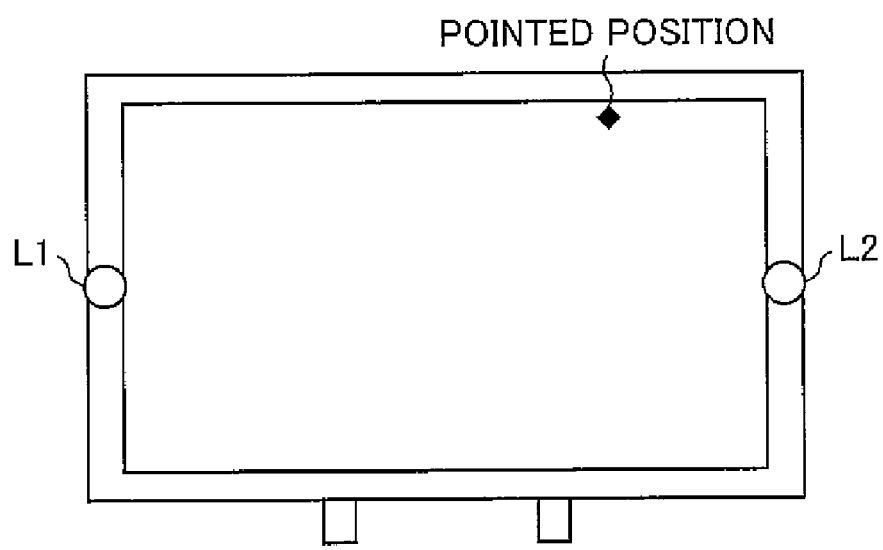
FIG. 28(a) is an explanatory diagram illustrating one example of positions of infrared-light-emitting areas and a pointed position in a conventional display system.
Figure 28B:
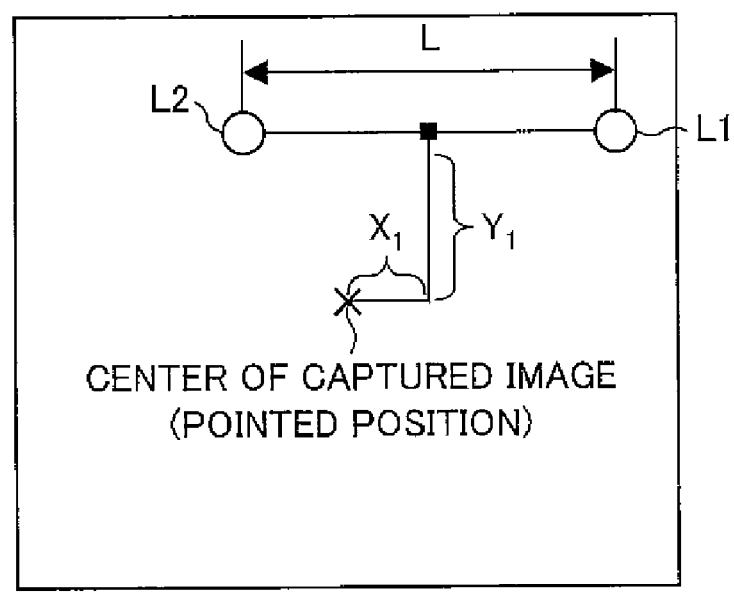
FIG. 28(b) is an explanatory diagram illustrating a captured image in a case where an image of the infrared-light-emitting areas and the pointed position are captured by an operating device that is turned upside down.

In the present embodiment, the display positions of the light-emitting areas are controlled so that the distance between the light-emitting areas becomes shorter as the distance between the display screen and the operating device 20 becomes shorter. As such, as illustrated in FIGS. 24(a) and 24(b), it is possible to display the light-emitting areas in the range in which the operating device can capture an image. As a result, it is possible to appropriately calculate the position pointed by the operating device 20 independently of the distance between the display screen and the operating device 20. FIG. 24(a) is an explanatory diagram illustrating an example of altered display positions of the light-emitting areas in a case where the distance between the display screen and the operating device 20 is long. FIG. 24(b) is an explanatory diagram illustrating an example of altered display positions of the light-emitting areas in a case where the distance between the display screen and the operating device 20 is short.

The present embodiment provides an explanation on an arrangement in which the lookup table in the memory section 37 is referred to when an altered distance between the light-emitting areas is calculated. However, the present embodiment is not limited to the arrangement. The arrangement can be replaced with the following arrangement, for example. Specifically, the memory section 37 stores a function that correlates (i) a distance between light-emitting areas, being displayed on a display screen, in the coordinate system of the display screen, (ii) a distance between the light-emitting areas in the coordinate system of a captured image, and (iii) an altered (set) distance between the light-emitting areas. And, an altered distance between the light-emitting areas is calculated by the function.

In the aforementioned embodiments, (i) the display controlling section 31 in the liquid crystal display apparatus 10, and (ii) the image processing module 24 and the controlling section 26, in the operating device 20 are realized by software with the use of a processor such as a CPU. Specifically, each of the display controlling section 31, the image processing module 24, and the controlling section 26 includes a CPU (central processing unit) and memory devices (memory media). The CPU (central processing unit) executes instructions in control programs for realizing required functions of each of the display controlling section 31, the image processing module 24, and the controlling section 26. The memory devices include a ROM (read only memory) in which the programs are stored, a RAM (random access memory) to which the programs are loaded, and a memory in which the programs and various data are stored. The object of the present invention can be achieved (i) by mounting to the liquid crystal display apparatus 10 or the operating device 20 a computer-readable storage medium in which control program code (executable program, intermediate code program, or source program) is stored for the liquid crystal display apparatus 10 or the operating device 20, which control program is software realizing the aforementioned functions, and (ii) by read-out and execution of the program code in the storage medium carried out by the computer (or CPU, MPU).

The storage medium can be, for example, a tape medium such as a magnetic tape or a cassette tape; a disk medium including (i) a magnetic disk such as a Floppy (Registered Trademark) disk or a hard disk and (ii) an optical disk such as CD-ROM/MO/MD/DVD/CD-R; a card medium such as an IC card (memory card) or an optical card; or a semiconductor memory medium such as a mask ROM/EPROM/EEPROM/flash ROM.

The liquid crystal display apparatus 10 and/or the operating device 20 may be arranged so as to be connectable to a communications network so that the program code is supplied through the communications network. The communications network is not to be particularly limited. Examples of the communications network include the Internet, intranet, extranet, LAN, ISDN, VAN, CATV communications network, virtual private network, telephone network, mobile communications network, and satellite communications network. Further, a transmission medium that constitutes the communications network is not particularly limited. Examples of the transmission medium include (i) wired lines such as IEEE 1394, USB, power-line carrier, cable TV lines, telephone lines, and ADSL lines and (ii) wireless connections such infrared radiation (IrDA, remote control), Bluetooth®, 802.11, HDR, mobile phone network, satellite connections, and terrestrial digital network. Note that the present invention can be also realized by the program codes in the form of a computer data signal embedded in a carrier wave which is embodied by electronic transmission.

The functional blocks of the liquid crystal display apparatus 10 and the operating device 20 can be realized by use of software, but not limited to this. The functional blocks can also be realized by use of hardware logic. Alternatively, the functional blocks can be realized by a combination of hardware that executes a part of processes and computing means for executing software that controls the hardware, and for executing residual ones of the processes.

The above embodiments provide explanations on a case where the present invention is applied to a liquid crystal display apparatus. However, the present invention is not limitedly applied to the liquid crystal display apparatus, and therefore is applicable to any display apparatus that allows a predetermined pixel within the display screen to function as a light-emitting area. The present invention is applicable to, for example, a plasma display, and an organic EL display.

The aforementioned embodiments provide explanations on arrangements in which a predetermined pixel (or a group of pixels) within a display screen emits light having a wavelength in the infrared wavelength region and the pixel (or the group of pixels) functions as a light-emitting area. However, the present invention is not limited to the arrangement. For example, it is also possible to separately provide (i) a display panel for displaying an image in accordance with image data and (ii) infrared-light emitting means, such as an LED, which functions as an infrared-light-emitting area within a display screen of the display panel. In this case, for example, the infrared-light emitting means can be provided on a surface of the display panel. Alternatively, the infrared-light emitting means can be provided so that light having a wavelength in the infrared wavelength region is emitted via a notch section of the display panel.

In the aforementioned embodiments, all the light-emitting areas are provided within the display screen. However, the present invention is not limited to the arrangement. It is sufficient to provide at least one light-emitting area within a display screen. Alternatively, it is also possible to adopt an arrangement in which a light-emitting area is provided outside a display screen and at least one infrared-light-emitting area is displayed within the display screen so that a pointed position on the display screen is calculated based on the infrared-light-emitting areas.

A display system of the present invention including: a display apparatus including a display screen on which an image is displayed in accordance with image data; an operating device for pointing a position, as a pointed position, on the display screen and for capturing an image including the pointed position on the display screen, the operating device being not in touch with the display screen; two or more infrared-light-emitting areas each emitting light having a wavelength in an infrared wavelength region, the infrared-light-emitting areas being provided to the display apparatus; and pointed position detecting section that detects the pointed position on the display screen, based on positions of the infrared-light-emitting areas included in a captured image that is captured by the operating device, the display system includes: a light-emitting area distinguishing section that distinguishes each of the infrared-light-emitting areas in the captured image, at least one of the infrared-light-emitting areas being provided within the display screen of the display apparatus, the infrared-light-emitting areas each emitting light in a method that allows the light-emitting area distinguishing section to distinguish, based on the captured image, each of the infrared-light-emitting areas from one another.

According to the arrangement, at least one of the infrared-light-emitting areas each emitting light having a wavelength in an infrared wavelength region is provided in the display screen. As compared with a conventional arrangement in which an infrared-light-emitting area is provided only outside a display screen, this arrangement allows a distance between a display apparatus and an operating device to become shorter which distance is required for including two or more infrared-light-emitting areas in a range in which an image can be captured. Accordingly, this allows a distance between the display screen and the operating device to become shorter which distance is required for properly calculating a position, on the display screen, pointed by the operating device. As a result, the position, on the display screen, pointed by the operating device can be properly detected even in a case where the distance between the operating device and the display apparatus is short.

Further, according to the above arrangement, each of the infrared-light-emitting areas is caused to emit light in a method that allows the light-emitting area distinguishing section to distinguish each of the infrared-light-emitting areas, based on the captured image. Accordingly, even in a case where the operating device is rotated, at the time when the image is captured, with respect to a reference position (a position in which the x-axis direction and y-axis direction in the coordinate system of the display screen agrees with the x-axis direction and the y-axis direction in the coordinate system of the captured image) around an axis in an image capture direction, a pointed position on the display screen can be properly detected in consideration of the rotation, based on respective positions of the light-emitting areas and the result of distinguishing each of the light-emitting areas.

The display system of the present invention may be arranged such that: each of the infrared-light-emitting areas is different from each other in at least one of a luminance, a light emitting time, a light emitting period, a light emitting pattern, and a number of times of switching ON/OFF in a predetermined time.

According to the arrangement, at least one of the luminance, the light emitting time, the light emitting period, the light emitting pattern, and the number of times of switching ON/OFF in a predetermined time is different in each of the infrared-light-emitting areas. Accordingly, each of the infrared-light-emitting areas in the captured image can be distinguished.

The display system of the present invention may further includes: a rotation angle calculating section that calculates a rotation angle of the operating device around an axis in an image capture direction of the operating device at the time when the captured image is captured, based on the positions of the infrared-light-emitting areas displayed on the display screen and positions of the infrared-light-emitting areas in the captured image, the pointed position detecting section detecting the pointed position on the display screen, based on (i) the positions of the infrared-light-emitting areas, in the captured image, (ii) the pointed position in the captured image, (iii) the positions of the infrared-light-emitting areas, on the display screen, and (iv) the rotation angle calculated by the rotation angle calculating section.

According to the arrangement, the rotation angle calculating section calculates a rotation angle of the operating device around an axis in the image capture direction of the operating device at the time when an image is captured, based on positions of the infrared-light-emitting areas displayed on the display screen and positions the infrared-light-emitting areas in the captured image. Then, the pointed position detecting section detects the pointed position on the display screen, based on (i) the positions of the infrared-light-emitting areas in the captured image, (ii) the pointed position in the captured image, (iii) the positions of the infrared-light-emitting areas on the display screen, and (iv) the rotation angle calculated by the rotation angle calculating section. This makes it possible to properly detect a pointed position on the display screen in consideration of the rotation, based on the positions of the light-emitting areas and a result of distinguishing each of the light-emitting areas, even in a case where the operating device is rotated with respect to a reference position around an axis in an image capture direction at the time when an image is captured.

The display system of the present invention may be arranged such that: the display screen is made of a display panel including many pixels arranged in a matrix manner; each of the many pixels includes a plurality of sub-pixels each emitting light having a wavelength in a different wavelength region; and at least a part of the many pixels includes, in the sub-pixels, infrared sub-pixels emitting light in an infrared wavelength region, respectively, the display system further including display controlling section controlling an intensity of light that is emitted from each of the sub-pixels and causing at least a part of the infrared sub-pixels to serve as the infrared-light-emitting areas.

This arrangement allows infrared sub-pixels provided in a display panel to function as infrared-light-emitting areas, respectively. This accordingly eliminates the need for separately providing a display panel and a light source which is used as the infrared-light-emitting areas. As a result, this prevents an increase in a size of the display apparatus and reduces the number of parts, as compared with a case where the display panel and the light source are separately provided. In addition, the arrangement allows sub-pixels except the infrared sub-pixels in the pixels to display an image in accordance with image data. This minimizes a decrease in resolution that is caused by the provision of the infrared-light-emitting areas.

The display system of the present invention may be arranged such that: the display panel is a transmissive liquid crystal display panel; a backlight is provided on a side opposite to an image display side of the liquid crystal display panel, the backlight emitting light having a spectral distribution in the infrared wavelength region; and a color filter layer is provided in the liquid crystal display panel and transmits light in a wavelength region corresponding to each of the sub-pixels in an area corresponding to each of the sub-pixels.

This arrangement makes it possible to transmit light having a wavelength in an infrared wavelength region through infrared sub-pixels, which light is emitted from the backlight. This makes it possible to cause the infrared sub-pixels to function as the infrared-light-emitting areas.

The display system of the present invention may be arranged such that: the display screen is made of a transmissive liquid crystal display panel including many pixels arranged in a matrix manner; and light sources of colors including red, green, blue, and infrared are provided on a side opposite to an image display side of the liquid crystal display panel, and for each of the many pixels or for each of pixel groups each made of a plurality of pixels, the display system further including display controlling section sequentially driving, in a time sharing manner, the light sources of the colors in each of the many pixels or each of the pixel groups so that an image in accordance with the image data and the infrared-light-emitting areas are displayed.

According to the arrangement, an infrared image (an image having a wavelength in an infrared wavelength region) is displayed by the liquid crystal display panel. Accordingly, it becomes possible to cause the infrared image to function as the infrared-light-emitting areas. Moreover, because an image display in accordance with image data and a display of the infrared-light-emitting areas can be performed by using the same pixels, it becomes possible to prevent deterioration, due to the display of the infrared-light-emitting areas, in a resolution of the liquid crystal display panel.

The display system of the present invention may be arranged such that: the display controlling section changes the positions of the infrared-light-emitting areas so that positions at which the infrared-light-emitting areas are displayed become closer to the pointed position than positions at which the infrared-light-emitting areas are previously displayed, the pointed position being detected by the pointed position detecting section.

According to the above arrangement, the infrared-light-emitting areas can be displayed in the vicinity of the pointed position. Therefore, even in a case where a distance between the operating device and the display screen is short, the infrared-light-emitting areas can be more reliably included in the captured image. As a result, the pointed position on the display screen can be more properly calculated.

The display system of the present invention may be arranged such that: the display controlling section makes a predetermined image displayed at a position corresponding to the pointed position on the display screen.

According to the arrangement, displaying a predetermined image at a position corresponding to a pointed position on a display screen allows a user observing the display screen to recognize the pointed position that is pointed by the operating device.

According to the present invention, a method for detecting a pointed position in a display system including: a display apparatus including a display screen on which an image is displayed in accordance with image data; an operating device for pointing a position, as a pointed position, on the display screen and for capturing an image including the pointed position on the display screen, the operating device being not in touch with the display screen; and two or more infrared-light-emitting areas each emitting light having a wavelength in an infrared wavelength region, the infrared-light-emitting areas being provided to the display apparatus, the display system detecting the pointed position on the display screen, based on positions of the infrared-light-emitting areas included in a captured image that is captured by the operating device, the method includes the steps of: providing at least one of the infrared-light-emitting areas within the display screen of the display apparatus; and causing each of the infrared-light-emitting areas to emit light in a method that allows each of the infrared-light-emitting areas to be distinguished, based on the captured image, by a light-emitting area distinguishing section provided in the display system.

According to the method, at least one of the infrared-light-emitting areas each emitting light having a wavelength in an infrared wavelength region is provided in the display screen. As compared with a conventional case in which an infrared-light-emitting area is provided only outside a display screen, this arrangement allows a distance between a display apparatus and an operating device to become shorter which distance is required for including two or more infrared-light-emitting areas in a range in which an image can be captured. Accordingly, this allows a distance between the display screen and the operating device to become shorter which distance is required for properly calculating a position, on the display screen, pointed by the operating device. As a result, the position, on the display screen, pointed by the operating device can be properly detected even in a case where the distance between the operating device and the display apparatus is short.

According to the method, each of the infrared-light-emitting areas is caused to emit light in a method that allows the light-emitting area distinguishing section provided in the display system to distinguish each of the infrared-light-emitting areas based on the captured image. This makes it possible to properly detect the pointed position on the display screen in consideration of the rotation obtained based on the positions of the light-emitting areas and the result of distinguishing each of the light-emitting areas, even in a case where the operating device is rotated with respect to a reference position around an axis in the image capture direction at the time when an image is captured.

The display system may be realized by a computer. In such a case, the present invention encompasses (i) a program for causing the computer to function as each section, thereby realizing the display system by the computer, and (ii) a computer-readable storage medium storing the program.

The present invention is applicable to a display system including a display apparatus and an operating device that, being not in touch with the display screen, points a position on a display screen. The present invention is applicable to, for example, a pointing device that points as appropriate a position on a display screen of the display apparatus with the use of an operating device in a case where an image is displayed on the display screen for a meeting, a presentation, a game, or the like.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A display system comprising: a display apparatus including a display screen on which an image is displayed in accordance with image data; an operating device for pointing a position, as a pointed position, on the display screen and for capturing an image including the pointed position on the display screen, the operating device being not in touch with the display screen; two or more infrared-light-emitting areas each emitting light having a wavelength in an infrared wavelength region, the infrared-light-emitting areas being provided to the display apparatus; and a pointed position detecting section that detects the pointed position on the display screen, based on positions of the infrared-light-emitting areas included in a captured image that is captured by the operating device, the display system comprising:

a light-emitting area distinguishing section that distinguishes each of the infrared-light-emitting areas in the captured image,
   at least one of the infrared-light-emitting areas being provided within the display screen of the display apparatus,
   the infrared-light-emitting areas each emitting light in a method that allows the light-emitting area distinguishing section to distinguish, based on the captured image, each of the infrared-light-emitting areas from one another.

2. The display system as set forth in claim 1 wherein:
   each of the infrared-light-emitting areas is different from each other in at least one of a luminance, a light emitting time, a light emitting period, a light emitting pattern, and a number of times of switching ON/OFF in a predetermined time.

3. The display system as set forth in claim 1, further comprising:
   a rotation angle calculating section that calculates a rotation angle of the operating device around an axis in an image capture direction of the operating device at the time when the captured image is captured, based on the positions of the infrared-light-emitting areas displayed on the display screen and positions of the infrared-light-emitting areas in the captured image, the pointed position detecting section detecting the pointed position on the display screen, based on (i) the positions of the infrared-light-emitting areas, in the captured image, (ii) the pointed position in the captured image, (iii) the positions of the infrared-light-emitting areas, on the display screen, and (iv) the rotation angle calculated by the rotation angle calculating section.

4. The display system as set forth in claim 1, wherein:
the display screen is made of a display panel including many pixels arranged in a matrix manner;
each of the many pixels includes a plurality of sub-pixels each emitting light having a wavelength in a different wavelength region; and
at least a part of the many pixels includes, in the sub-pixels, infrared sub-pixels emitting light in an infrared wavelength region, respectively,
the display system further comprising a display controlling section controlling an intensity of light that is emitted from each of the sub-pixels and causing at least a part of the infrared sub-pixels to serve as the infrared-light-emitting areas.

5. The display system as set forth in claim 4, wherein:
the display panel is a transmissive liquid crystal display panel;
a backlight is provided on a side opposite to an image display side of the liquid crystal display panel, the backlight emitting light having a spectral distribution in the infrared wavelength region; and
a color filter layer is provided in the liquid crystal display panel and transmits light in a wavelength region corresponding to each of the sub-pixels in an area corresponding to each of the sub-pixels.

6. The display system as set forth in claim 4, wherein:
the display controlling section changes the positions of the infrared-light-emitting areas so that positions at which the infrared-light-emitting areas are displayed become closer to the pointed position than positions at which the infrared-light-emitting areas are previously displayed, the pointed position being detected by the pointed position detecting section.

7. The display system as set forth in claim 4, wherein:
the display controlling section makes a predetermined image displayed at a position corresponding to the pointed position on the display screen.

8. The display system as set forth in claim 1, wherein:
the display screen is made of a transmissive liquid crystal display panel including many pixels arranged in a matrix manner; and
light sources of colors including red, green, blue, and infrared are provided on a side opposite to an image display side of the liquid crystal display panel, and for each of the many pixels or for each of pixel groups each made of a plurality of pixels,
the display system further comprising a display controlling section sequentially driving, in a time sharing manner, the light sources of the colors in each of the many pixels or each of the pixel groups so that an image in accordance with the image data and the infrared-light-emitting areas are displayed.

9. The display system as set forth in claim 8, wherein:
the display controlling section changes the positions of the infrared-light-emitting areas so that positions at which the infrared-light-emitting areas are displayed become closer to the pointed position than positions at which the infrared-light-emitting areas are previously displayed, the pointed position being detected by the pointed position detecting section.

10. The display system as set forth in claim 8, wherein:
the display controlling section makes a predetermined image displayed at a position corresponding to the pointed position on the display screen.

11. A method for detecting a pointed position in a display system comprising: a display apparatus including a display screen on which an image is displayed in accordance with image data; an operating device for pointing a position, as a pointed position, on the display screen and for capturing an image including the pointed position on the display screen, the operating device being not in touch with the display screen; and two or more infrared-light-emitting areas each emitting light having a wavelength in an infrared wavelength region, the infrared-light-emitting areas being provided to the display apparatus, the display system detecting the pointed position on the display screen, based on positions of the infrared-light-emitting areas included in a captured image that is captured by the operating device, the method comprising the steps of:
providing at least one of the infrared-light-emitting areas within the display screen of the display apparatus; and
causing each of the infrared-light-emitting areas to emit light in a method that allows each of the infrared-light-emitting areas to be distinguished, based on the captured image, by a light-emitting area distinguishing section provided in the display system.

12. A non-transitory computer-readable storage medium storing a program causing a computer to function as each section in a display system,
the display system comprising:
a display apparatus including a display screen on which an image is displayed in accordance with image data;
an operating device for pointing a position, as a pointed position, on the display screen and for capturing an image including the pointed position on the display screen, the operating device being not in touch with the display screen;
two or more infrared-light-emitting areas each emitting light having a wavelength in an infrared wavelength region, the infrared-light-emitting areas being provided to the display apparatus;
a pointed position detecting section that detects the pointed position on the display screen, based on positions of the infrared-light-emitting areas included in a captured image that is captured by the operating device; and
a light-emitting area distinguishing section that distinguishes each of the infrared-light-emitting areas in the captured image,
at least one of the infrared-light-emitting areas being provided within the display screen of the display apparatus, and
the infrared-light-emitting areas each emitting light in a method that allows the light-emitting area distinguishing section to distinguish, based on the captured image, each of the infrared-light-emitting areas from one another.

* * * * *